United States Patent
Paddock et al.

(10) Patent No.: US 10,866,007 B2
(45) Date of Patent: Dec. 15, 2020

(54) CASCADED INDOOR AIR QUALITY AND OUTDOOR AIR FLOW ECONOMIZER SYSTEM

(71) Applicant: JOHNSON CONTROLS TECHNOLOGY COMPANY, Auburn Hills, MI (US)

(72) Inventors: Tyler K. Paddock, Greenfield, WI (US); Christopher R. Amundson, Grafton, WI (US); Nathan T. Ostrye, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/246,263

(22) Filed: Jan. 11, 2019

(65) Prior Publication Data
US 2020/0224913 A1    Jul. 16, 2020

(51) Int. Cl.
| F24F 11/64 | (2018.01) |
| F24F 11/74 | (2018.01) |
| F24F 11/46 | (2018.01) |
| F24F 110/32 | (2018.01) |
| F24F 110/50 | (2018.01) |

(52) U.S. Cl.
CPC .............. F24F 11/64 (2018.01); F24F 11/46 (2018.01); F24F 11/74 (2018.01); *F24F 2110/32* (2018.01); *F24F 2110/50* (2018.01)

(58) Field of Classification Search
CPC .. F24F 11/64; F24F 11/74; F24F 11/46; F24F 2110/32; F24F 2110/50
See application file for complete search history.

(56) References Cited

U.S. PATENT DOCUMENTS

| 5,707,005 A * | 1/1998 | Kettler | F24F 3/044 236/49.3 |
| 5,971,067 A * | 10/1999 | Rayburn | F24F 11/30 165/217 |
| 6,219,590 B1 * | 4/2001 | Bernaden, III | G05B 9/02 700/277 |
| 7,580,775 B2 | 8/2009 | Kulyk et al. | |
| 7,894,946 B2 | 2/2011 | Kulyk et al. | |
| 8,527,108 B2 | 9/2013 | Kulyk et al. | |
| 8,527,109 B2 | 9/2013 | Kulyk et al. | |
| 8,918,223 B2 | 12/2014 | Kulyk et al. | |
| 9,110,647 B2 | 8/2015 | Kulyk et al. | |
| 9,618,224 B2 * | 4/2017 | Emmons | G05B 19/048 |

(Continued)

*Primary Examiner* — Vincent H Tran
(74) *Attorney, Agent, or Firm* — Foley & Lardner LLP

(57) ABSTRACT

A controller for an economizer that provides outdoor air to a conditioned space. The controller includes an error calculator configured determine an indoor air quality (IAQ) setpoint error based on an actual IAQ and an IAQ setpoint, an outdoor air flow (OAF) setpoint adjuster configured to determine an adjusted OAF setpoint based on at least one of the IAQ setpoint error, an initial OAF setpoint, and an OAF setpoint upper limit, and a proportional variable deadband controller (PVDC) configured to adjust an operational deadband of the economizer and adjust an operation of at least one of an actuator and a damper of the economizer to achieve the adjusted OAF based on at least one of an actual OAF and the adjusted OAF setpoint. Achieving the adjusted OAF drives the actual IAQ to the IAQ setpoint.

20 Claims, 12 Drawing Sheets

(56) References Cited

U.S. PATENT DOCUMENTS

| | | | |
|---|---|---|---|
| 9,703,339 B2 | 7/2017 | Kulyk et al. | |
| 10,139,877 B2 | 11/2018 | Kulyk et al. | |
| 2006/0234621 A1* | 10/2006 | Desrochers | F24F 3/044 454/239 |
| 2008/0277486 A1* | 11/2008 | Seem | H04L 67/125 236/49.3 |
| 2009/0126382 A1* | 5/2009 | Rubino | F24F 3/166 62/259.1 |
| 2012/0232702 A1* | 9/2012 | Vass | G05D 23/1934 700/277 |
| 2013/0096722 A1* | 4/2013 | Clanin | F24F 11/0001 700/276 |
| 2014/0260965 A1* | 9/2014 | Finkam | B01D 53/30 95/12 |
| 2016/0370029 A1* | 12/2016 | Kurelowech | F24F 12/006 |
| 2017/0130981 A1* | 5/2017 | Willette | F24F 3/16 |

* cited by examiner

CASCADED INDOOR AIR QUALITY AND OUTDOOR AIR FLOW ECONOMIZER SYSTEM

BACKGROUND

The present disclosure relates generally to HVAC systems for a building and more particularly to airside economizers in a building HVAC system. Economizers are a type of air handling unit (AHU) in a building HVAC system that provide ventilation to a building space. Economizers are capable of both recirculating air from the building space and introducing outside air into the building space by varying an amount of outside air permitted to pass through the economizer.

SUMMARY

One implementation of the present disclosure is a controller for an economizer that provides outdoor air to a conditioned space, according to some embodiments. In some embodiments, the controller includes an error calculator configured determine an indoor air quality (IAQ) setpoint error based on an actual IAQ and an IAQ setpoint, an outdoor air flow (OAF) setpoint adjuster configured to determine an adjusted OAF setpoint based on at least one of the IAQ setpoint error, an initial OAF setpoint, and an OAF setpoint upper limit, and a proportional variable deadband controller (PVDC) configured to adjust an operational deadband of the economizer and adjust an operation of at least one of an actuator and a damper of the economizer to achieve the adjusted OAF based on at least one of an actual OAF and the adjusted OAF setpoint. In some embodiments, achieving the adjusted OAF drives the actual IAQ to the IAQ setpoint.

In some embodiments, the controller is further configured to receive information from one or more sensors. In some embodiments, the one or more sensors are configured to measure at least one of the actual IAQ and the actual OAF of the conditioned space and the received information is a signal associated with at least one of the actual IAQ and the actual OAF. In some embodiments, the error calculator is configured to determine the IAQ setpoint error by calculating a difference between the IAQ setpoint and the actual IAQ.

In some embodiments, the OAF setpoint adjuster is configured to determine the adjusted OAF setpoint based on a linear relationship between the IAQ setpoint error and an amount to increase or decrease the initial OAF setpoint to achieve the adjusted OAF setpoint.

In some embodiments, the OAF setpoint adjuster is configured to determine an adjusted OAF setpoint greater than the initial OAF setpoint in response to the IAQ error being a positive value greater than a positive threshold value. In some embodiments, the IAQ error being a positive value indicates the actual IAQ is less than the IAQ setpoint.

In some embodiments, the positive threshold value is zero.

In some embodiments, the controller is further configured to update the initial OAF setpoint with the adjusted OAF setpoint in response to the actual OAF being driven to the adjusted OAF setpoint.

In some embodiments, the at least one sensor is at least one of an air quality sensor and a flow rate sensor. In some embodiments, the air quality sensor is configured to measure the actual IAQ of the conditioned space. In some embodiments, the flow rate sensor is configured to measure the actual OAF of outdoor air provided to the conditioned space.

Another implementation of the present disclosure is a control system for an economizer. In some embodiments, the control system includes an economizer configured to facilitate an outdoor air flow (OAF) of outdoor air into a conditioned space, a flow rate sensor configured to measure an actual OAF of the outdoor air entering the conditioned space, an air quality sensor configured to measure an actual indoor air quality (IAQ) of the conditioned space, and a controller. In some embodiments, the controller is configured to receive the actual IAQ of the conditioned space and determine an IAQ setpoint error based on the actual IAQ and an IAQ setpoint, determine an adjusted OAF setpoint by determining an increase amount based on the IAQ setpoint error, perform proportional variable deadband control based on at least one of the adjusted OAF setpoint and the actual OAF to adjust a deadband of the economizer and generate control signals to cause the economizer to facilitate the OAF at the adjusted OAF setpoint, and adjust an operation of at least one of an actuator and a damper of the economizer to cause outdoor air to enter the conditioned space at the adjusted OAF setpoint.

In some embodiments, the controller is configured to determine the adjusted OAF setpoint by adding the increase amount to an initial OAF setpoint.

In some embodiments, the controller is configured to determine the adjusted OAF setpoint based on a linear relationship between OAF and the IAQ setpoint error.

In some embodiments, the controller is configured to determine that the adjusted OAF setpoint is greater than the initial OAF setpoint in response to the actual IAQ being less than the IAQ setpoint.

In some embodiments, the linear relationship is a piece wise function.

In some embodiments, the determined IAQ setpoint error is a difference between the IAQ setpoint and the actual IAQ.

In some embodiments, the adjusted OAF setpoint ensures that the IAQ setpoint is met or exceeded.

In some embodiments, the controller is configured to determine a signal to noise ratio of a signal associated with the actual OAF and adjust the deadband of the economizer based on the determined signal to noise ratio.

Another implementation of the present disclosure is a method for controlling an economizer. In some embodiments, the method includes receiving, from a first sensor, an actual indoor air quality (IAQ) of a conditioned space, determining an IAQ setpoint error based on the actual IAQ and an IAQ setpoint, determining an adjusted outdoor air flow (OAF) setpoint based on the IAQ setpoint error and an initial OAF setpoint, receiving, from a second sensor, an actual outdoor air flow (OAF) of outdoor air entering the conditioned space, adjusting a deadband of the economizer and generating control signals for the economizer to achieve the adjusted OAF setpoint based on the actual OAF, controlling the economizer to drive the actual OAF to the adjusted OAF setpoint, and repeating the steps of receiving the actual OAF from the second sensor, adjusting the deadband and generating control signals, and controlling the economizer until the actual OAF meets the OAF setpoint.

In some embodiments, determining the adjusted OAF setpoint further includes determining a required increase or decrease of the initial OAF setpoint based on a linear relationship between the IAQ setpoint error and a required change of the initial OAF setpoint.

In some embodiments, determining the adjusted OAF setpoint further includes increasing the initial OAF setpoint in response to the IAQ setpoint being greater than the actual IAQ and decreasing the initial OAF setpoint in response to the IAQ setpoint being less than the actual IAQ.

In some embodiments, the method further includes defining the adjusted OAF setpoint as the initial OAF setpoint in response to the IAQ setpoint error being negligible.

In some embodiments, the method further includes determining a signal to noise ratio of a signal associated with the actual OAF and adjusting the deadband based on the signal to noise ratio.

DETAILED DESCRIPTION

Overview

Figure 1:
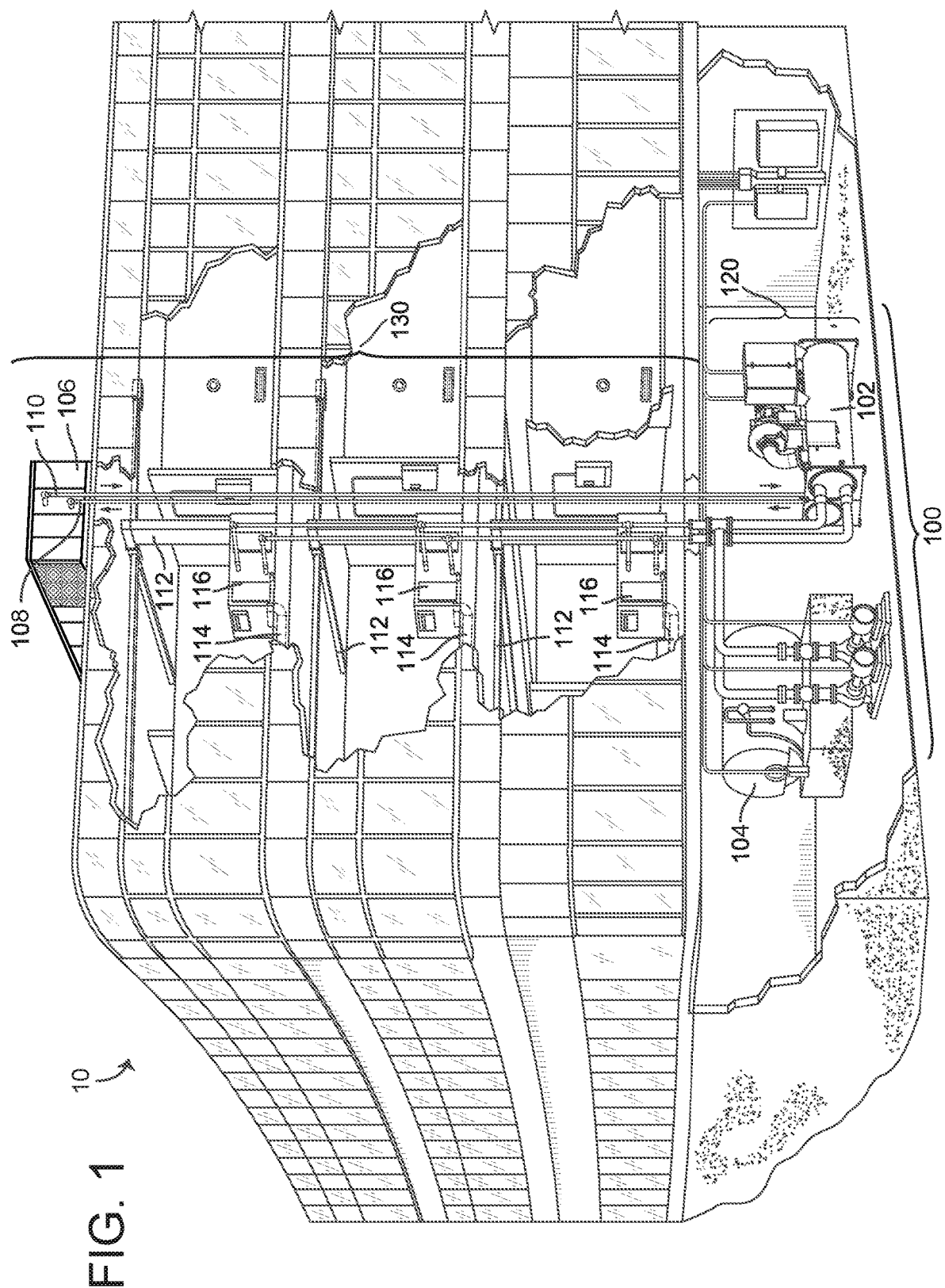
FIG. 1 is a drawing of a building equipped with a HVAC system, according to some embodiments.

Referring generally to the FIGURES, a cascaded control system for an economizer is shown, according to some embodiments. The cascaded control system may include an economizer, a conditioned space, a controller configured to control the economizer, a flow rate sensor, and an indoor air quality sensor. The economizer is configured to bring outdoor air into a conditioned space to cool the conditioned space and/or improve the indoor air quality of the conditioned space. The economizer may include dampers and actuators which may be adjusted by the controller and are configured to control the outdoor air flow (e.g., velocity, volumetric flow rate, mass flow rate, etc.) supplied to the conditioned space. The flow rate sensor may be configured to measure a flow rate of the outdoor air being supplied to the conditioned space by the economizer. The indoor air quality sensor may be configured to measure an indoor air quality of the conditioned space. Both the flow rate of the outdoor supply air as measured by the flow rate sensor and the air quality of the conditioned space as measured by the indoor air quality sensor may be provided to the controller. The controller may receive the indoor air quality from the indoor air quality sensor and determine an error between the indoor air quality from the indoor air quality sensor and a setpoint indoor air quality. The controller may then determine an adjusted outdoor air flow setpoint value based on the indoor air quality setpoint error. The adjusted outdoor air flow setpoint may be determined based on a linear relationship between the adjusted outdoor air flow setpoint and the indoor air quality setpoint error. The controller may then perform proportional variable deadband control using the adjusted outdoor air flow setpoint and the outdoor air flow supplied by the flow rate sensor to generate control signals to adjust controllable elements of the economizer. If the controller determines that the outdoor air flow setpoint is to be increased to an adjusted air flow setpoint value which the economizer is not allowed to or cannot achieve, the controller may set the adjusted outdoor air flow setpoint to a maximum allowable outdoor air flow setpoint and uses the maximum allowable outdoor air flow for the proportional variable deadband control to generate control signals for controllable elements of the economizer.

Advantageously, the cascaded control system may combine an indoor air quality loop (e.g., an indoor air quality algorithm) with an outdoor air flow loop (e.g., an indoor air flow algorithm), allowing both the indoor air quality setpoint and the outdoor air flow to be met. Some control systems for economizers only use one of these loops at a time (e.g., only the indoor air quality loop or the outdoor air flow loop) and place a priority or feature enable to select which loop to use. Advantageously, the cascaded control system described herein may combine both of these algorithms into a single algorithm, reducing the need to manage or prioritize two algorithms.

Building HVAC Systems and Building Management Systems

Figure 2:
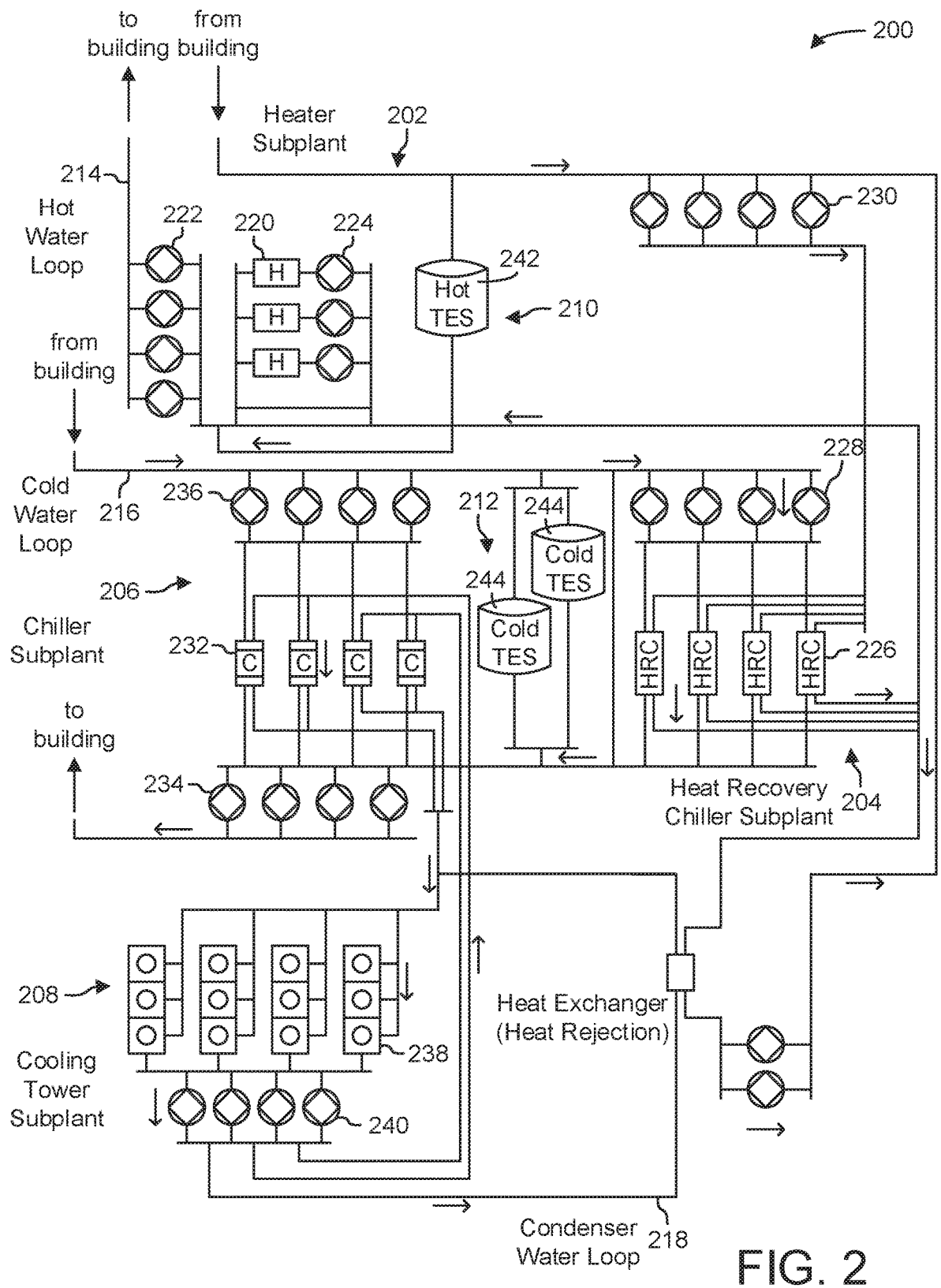
FIG. 2 is a schematic diagram of a waterside system which can be used in conjunction with the building of FIG. 1, according to some embodiments.
Figure 3:
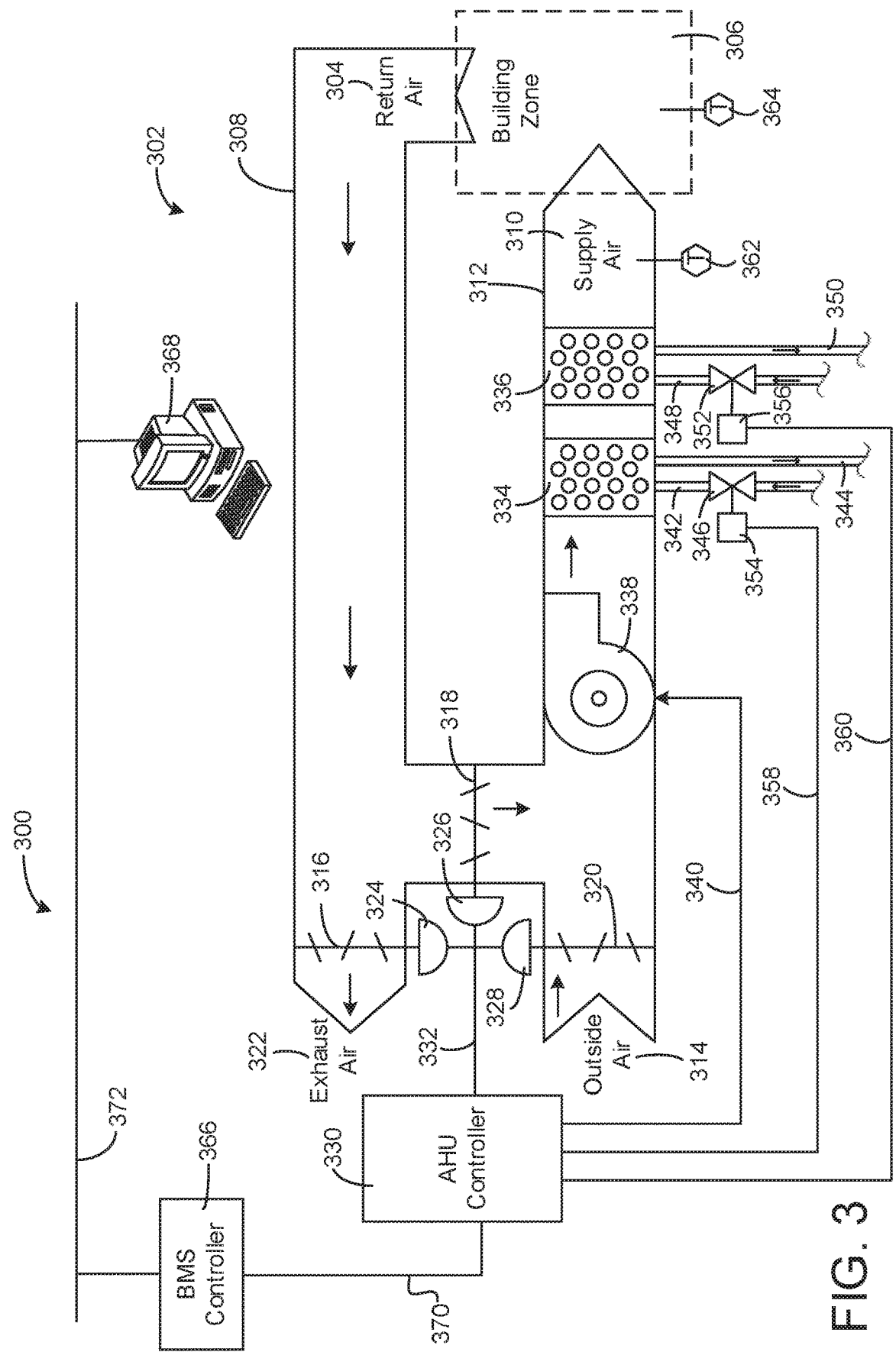
FIG. 3 is a schematic diagram of an airside system which can be used in conjunction with the building of FIG. 1, according to some embodiments.
Figure 4:
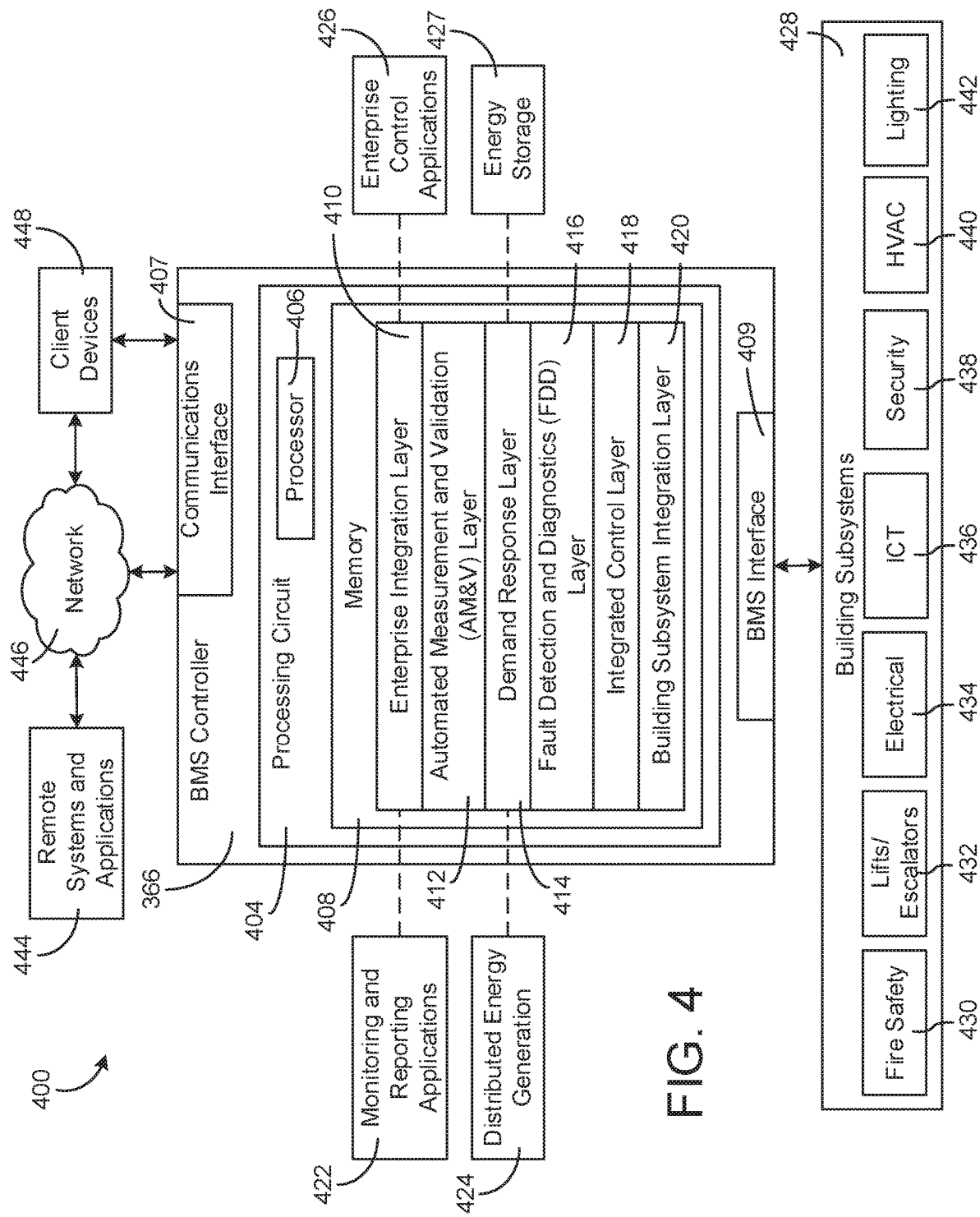
FIG. 4 is a block diagram of a building management system (BMS) which can be used to monitor and control the building of FIG. 1, according to some embodiments.
Figure 5:
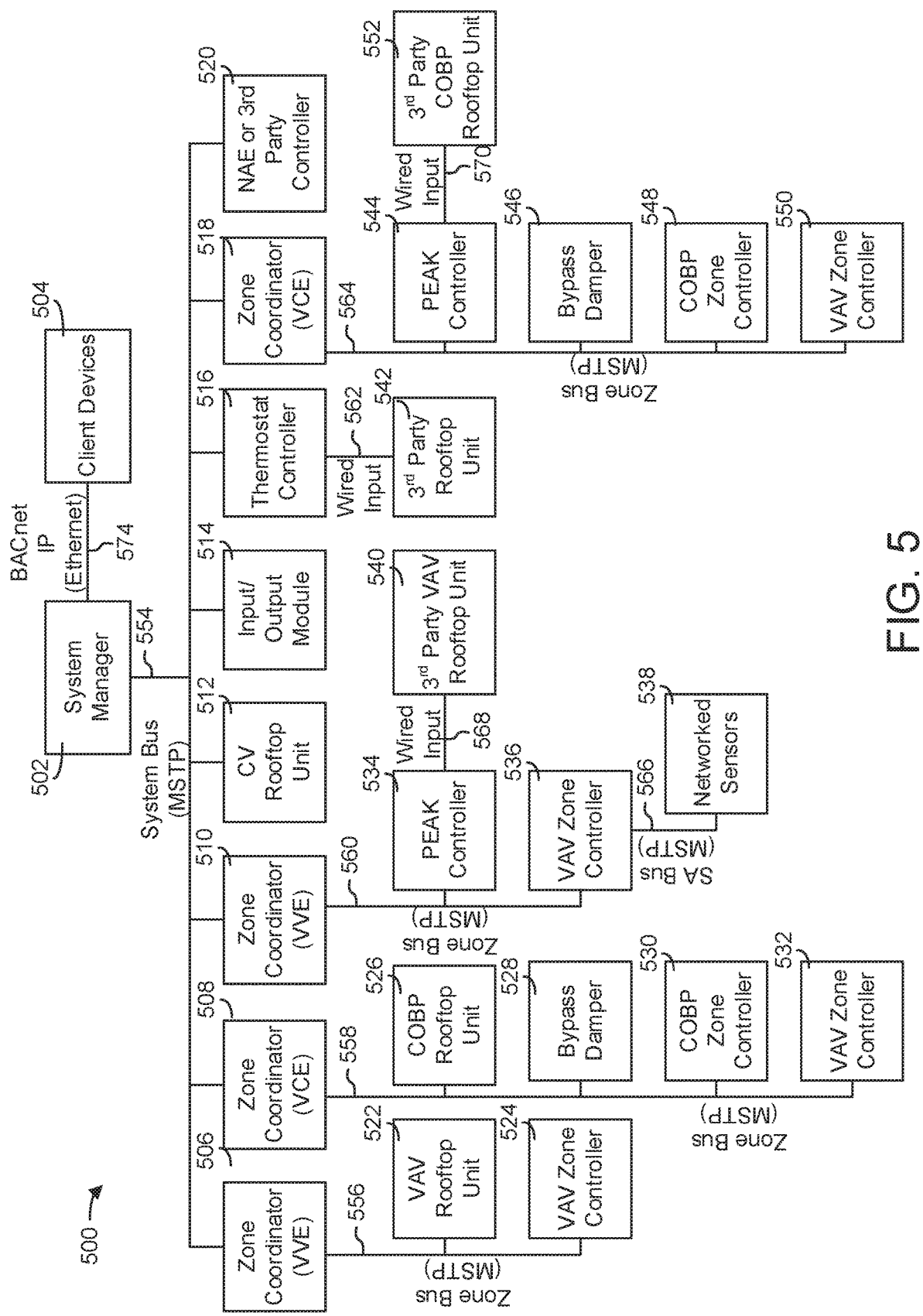
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Cascaded Air Quality Loop

Figure 6:
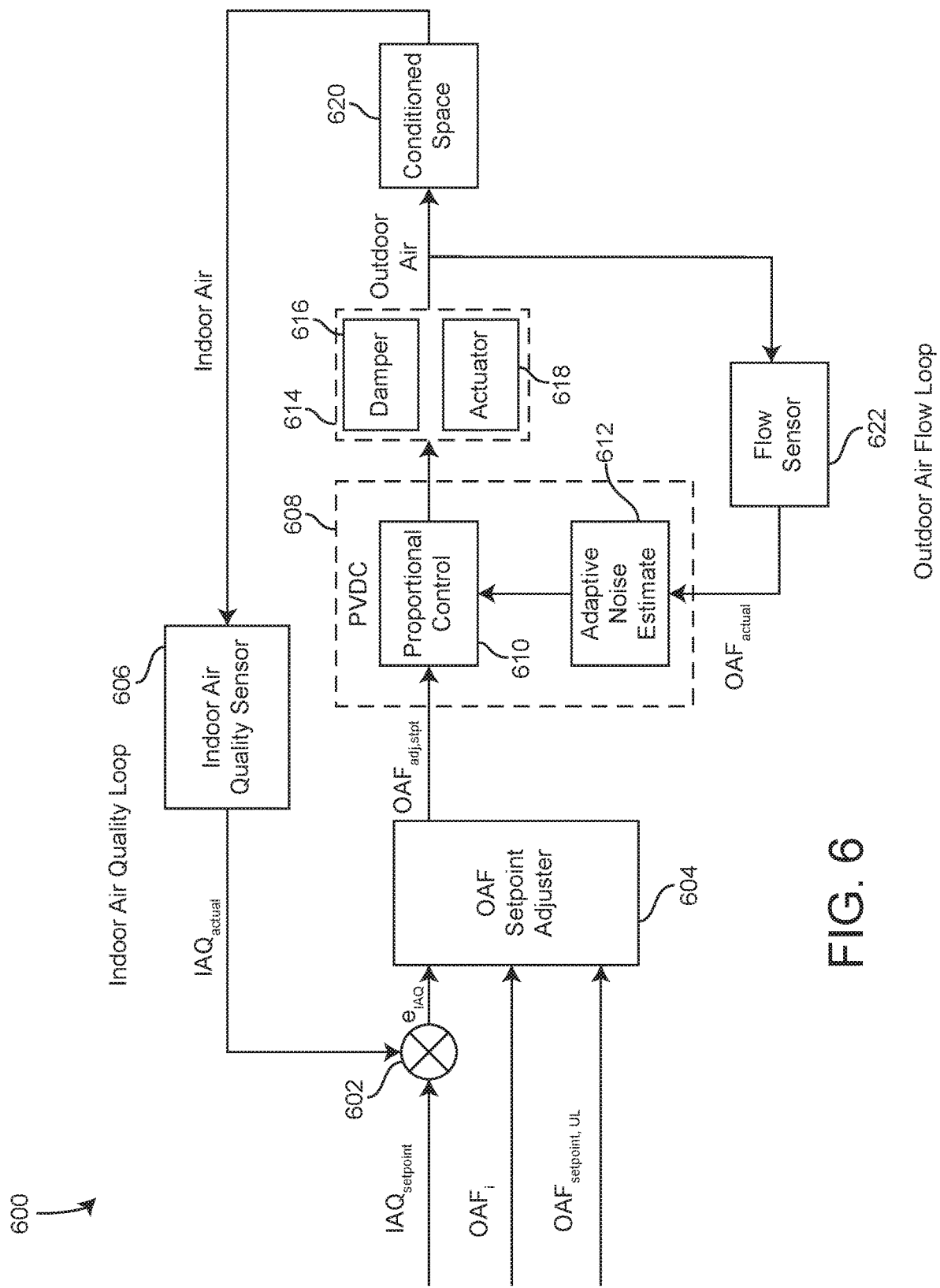
FIG. 6 is a block diagram of a cascaded economizer system, according to some embodiments.

Referring now to FIG. 6, a cascaded air quality loop 600 is shown, according to some embodiments. In some embodiments, cascaded air quality loop 600 is a system including various controllers and devices. In some embodiments, cascaded air quality loop 600 represents a cascaded air quality algorithm which is performed by a controller and/or a set of controllers. Cascaded air quality loop 600 is shown to include an outdoor air flow (OAF) setpoint adjuster 604, a proportional variable deadband controller (PVDC) 608, controllable elements 614, a flow sensor 622, a conditioned space 620, and an indoor air quality (IAQ) sensor 606, according to some embodiments. In some embodiments, OAF setpoint adjuster 604 is a module of a controller (e.g., controller 800, PVDC 608, etc.). In some embodiments, OAF setpoint adjuster 604 is a controller (e.g., having a processing circuit, processor, and memory). Cascaded air quality loop 600 adjustably controls at least one of an IAQ of conditioned space 620 and a ventilation of conditioned space 620 (e.g., a flow rate of outdoor air entering conditioned space 620), according to some embodiments. For example, cascaded air quality loop 600 may adjust an operation of an economizer of controllable elements 614 to adjust OAF supplied to condition conditioned space 620 by the economizer, according to some embodiments. In some embodiments, cascaded air quality loop 600 adjusts controllable elements 614 of an economizer (e.g., AHU 302) to maintain a setpoint temperature and/or IAQ of conditioned space 620. In cascaded air quality loop 600, controllable elements 614 include damper 616 and actuator 618, according to some embodiments. Damper 616 and actuator 618 are configured to adjustably control an amount or a flow rate of outdoor air which is provided to conditioned space 620 by the economizer, according to some embodiments.

Referring still to FIG. 6, PVDC 608 is shown receiving an adjusted OAF setpoint, $OAF_{adj,stpt}$ from OAF setpoint adjuster 604, according to some embodiments. PVDC 608 may receive the adjusted OAF setpoint and determine an operation of controllable elements 614 (i.e., damper 616 and actuator 618) to achieve the adjusted OAF setpoint. In some embodiments, PVDC 608 uses an adaptive deadband control method to determine control signals for controllable elements 614 to achieve the adjusted OAF setpoint. In some embodiments, the adaptive deadband control method of PVDC 608 reduces superfluous wear on at least one of the actuator 618 and the damper 616 by reducing the amount of times actuator 618 and/or damper 616 transition between various positions (e.g., open, closed, partially open, etc.). Advantageously, PVDC 608 reduces equipment dither (e.g., of actuator 618 and/or damper 616), reducing the likelihood that actuator 618 and/or damper 616 will wear out due to excessive use. The functionality of PVDC 608 is described in greater detail below with reference to FIGS. 7-10, according to some embodiments.

PVDC 608 is shown receiving actual OAF information, $OAF_{actual}$, from flow sensor 622, according to some embodiments. In some embodiments, PVDC 608 receives the actual OAF from flow sensor 622 and the adjusted OAF setpoint from OAF setpoint adjuster 604, and determines control signals for controllable elements 614 to achieve the adjusted OAF setpoint.

Referring still to FIG. 6, OAF setpoint adjuster 604 receives an IAQ setpoint error ($e_{IAQ}$) between IAQ setpoint and an actual indoor air quality ($IAQ_{actual}$), an initial OAF setpoint ($OAF_i$), and an OAF upper limit setpoint ($OAF_{setpoint,UL}$), according to some embodiments. OAF setpoint adjuster 604 uses the IAQ setpoint error ($e_{IAQ}$) and the OAF setpoint to determine the adjusted OAF setpoint based on the IAQ setpoint error, according to some embodiments. In some embodiments, the IAQ setpoint error is a difference between the indoor air quality measured by indoor air quality sensor 606 and the indoor air quality setpoint. In some embodiments, the difference (i.e., the error) is determined by summing junction 602. In some embodiments, the initial OAF setpoint is adjusted (e.g., increased or decreased). In some embodiments, the initial OAF setpoint is replaced with adjusted OAF setpoint. In some embodiments, the initial OAF setpoint is determined by an economizer controller and is not changed (e.g., updated, increased, decreased, replaced, etc.).

In some embodiments, OAF setpoint adjuster 604 determines the adjusted OAF setpoint by determining an amount to subtract from the initial OAF setpoint or add to the initial OAF setpoint based on the IAQ setpoint error. For example, OAF setpoint adjuster 604 may use a linear relationship between the IAQ setpoint error and the initial OAF setpoint. The linear relationship may be mathematically defined as an adjusted OAF setpoint equation:

$$OAF_{setpoint,adjusted} = OAF_i + e_{IAQ}\beta$$

where $\beta$ is a constant, $OAF_i$ is the initial OAF setpoint (e.g., a current OAF setpoint), and $OAF_{setpoint,adjusted}$ is the adjusted OAF setpoint to be supplied to PVDC 608, according to some embodiments. In some embodiments, $e_{IAQ}$ is determined by an equation: $e_{IAQ} = IAQ_{setpoint} - IAQ_{actual}$. In some embodiments, the $e_{IAQ}\beta$ term is an amount to increase or decrease to achieve the adjusted OAF setpoint. Using the error equation, if the actual IAQ is less than the IAQ setpoint, the $e_{IAQ}\beta$ term of the adjusted OAF setpoint equation is positive and therefore $OAF_{setpoint,adjusted}$ is increased relative to $OAF_i$. Likewise, if the actual IAQ is greater than the IAQ setpoint, the $e_{IAQ}\beta$ term of the adjusted OAF setpoint equation is negative and therefore $OAF_{setpoint,adjusted}$ is decreased. In some embodiments, OAF setpoint adjuster 604 only increases $OAF_i$. For example, if $e_{IAQ}$ is a negative value, OAF setpoint adjuster 604 may be configured to provide the initial OAF setpoint as the adjusted OAF setpoint (i.e., OAF setpoint adjuster 604 may not change the initial OAF setpoint).

In some embodiments, the value of the adjusted OAF setpoint is constrained to be less than or equal to the OAF upper limit setpoint. For example, the adjusted OAF setpoint can be defined by the following equation:

$$OAF_{setpoint,adjusted} = \min(OAF_{setpoint,UL}, OAF_i + e_{IAQ}\beta)$$

where $OAF_{setpoint,UL}$ is the OAF upper limit setpoint. In some embodiments, the OAF upper limit setpoint is a predetermined value. In some embodiments, the OAF upper limit setpoint is a maximum achievable OAF based on characteristics of any of controllable elements 614. In some embodiments, the OAF upper limit setpoint is a maximum allowable OAF based on characteristics of any of controllable elements 614 and/or the economizer of controllable elements 614. In some embodiments, the maximum allowable OAF is a value offset relative to a maximum achievable OAF given characteristics of the economizer and/or controllable elements 614 of the economizer (e.g., the maximum allowable OAF is 2% less than the maximum achievable OAF the maximum allowable OAF is 5% less than the maximum achievable OAF, etc.). If the hereinabove mentioned mathematical equation results in an $OAF_{setpoint,adjusted}$ value which exceeds the air flow upper limit setpoint value (i.e., $OAF_{setpoint,UL}$), OAF setpoint adjuster 604 is configured to output the OAF upper limit setpoint as $OAF_{setpoint,adjusted}$ to PVDC 608, according to some embodiments. In some embodiments, OAF setpoint adjuster 604 maintains a current OAF setpoint to PVDC 608 if the error does not exceed a predetermined value (e.g., a quantity, a percentage, a standard deviation, etc.). For example, if the IAQ setpoint error (i.e., $e_{IAQ}$) does not exceed a predetermined value, OAF setpoint adjuster 604 is configured to maintain a current OAF setpoint value, according to some embodiments.

Referring still to FIG. 6, IAQ sensor 606 is shown measuring indoor air from conditioned space 620, according to some embodiments. IAQ sensor 606 measures indoor air from conditioned space 620 and determines an air quality of the indoor air according to some embodiments. In some embodiments, IAQ sensor 606 supplies the measured IAQ to summing junction 602 and/or OAF setpoint adjuster 604. In some embodiments, IAQ sensor 606 identifies pollutants, particulates, or any other mass in the indoor air which is undesirable. In some embodiments, IAQ sensor 606 identifies a concentration of airborne particles. In some embodiments, IAQ sensor 606 identifies concentrations of any of the particulates and/or pollutants and/or other mass in the indoor air which is undesirable. For example, IAQ sensor 606 may be a carbon monoxide sensor and may identify a concentration of carbon monoxide in the indoor air of conditioned space 620, according to some embodiments. In some embodiments, IAQ sensor 606 is a carbon dioxide sensor and is configured to identify a concentration of carbon dioxide in the indoor air of conditioned space 620. In some embodiments, IAQ sensor 606 identifies a concentration in parts per million (ppm) of one or more types of airborne particulates. In some embodiments, IAQ sensor 606 identifies a singular IAQ. In some embodiments, IAQ sensor 606 is a set of IAQ sensors, configured to measure multiple IAQs. In some embodiments, IAQ sensor 606 is a set of IAQ sensors and determines an overall IAQ. In some embodiments, IAQ sensor 606 determines a set of IAQ values.

Referring still to FIG. 6, OAF setpoint adjuster 604 is shown supplying PVDC 608 with adjusted OAF setpoint, according to some embodiments. PVDC 608 is configured to receive the adjusted OAF setpoint, and determine control signals to adjust an operation of controllable elements 614 to achieve the adjusted OAF setpoint, according to some embodiments. In some embodiments, PVDC 608 is configured to receive feedback of actual OAF (i.e., $OAF_{actual}$) from flow sensor 622. The actual OAF is an actual flow of air provided to conditioned space 620 by the economizer. Flow sensor 622 is configured to identify/measure at least one of a mass flow rate, a volumetric flow rate, and a speed of actual OAF, according to some embodiments. In some embodiments, flow sensor 622 is positioned in a flow path of the actual OAF. In some embodiments, flow sensor 622 is a component of the economizer.

Flow sensor 622 provides the measured/identified actual OAF to PVDC 608, according to some embodiments. In some embodiments, PVDC 608 receives the measured/identified actual OAF and adjusts a deadband based on the measured/identified actual OAF. In some embodiments, PVDC 608 increases a magnitude of the deadband in response to adaptive noise estimate module 612 identifying an amount of noise in a signal associated with the measured/identified OAF received from flow sensor 622. In some embodiments, adaptive noise estimate module 612 identifies a signal to noise ratio of the signal associated with the measured/identified OAF received from flow sensor 622.

Cascaded air loop 600 adjusts an OAF setpoint to achieve a desired IAQ, according to some embodiments. Additionally, cascaded air loop 600 adjusts a deadband value in order to achieve the adjusted OAF, according to some embodiments. In this way, cascaded air loop 600 is able to use both the outdoor air flow setpoint as well as the IAQ setpoint. Advantageously, cascaded air loop 600 combines an indoor air quality loop (e.g., formed by summing junction 602, OAF setpoint adjuster 604, PVDC 608, controllable elements 614, conditioned space 620 and IAQ sensor 606) and an outdoor air flow loop (e.g., formed by PVDC 608, controllable elements 614, and flow sensor 622), allowing both the desired outdoor air flow rate and the desired IAQ to be used simultaneously, according to some embodiments. In this way, cascaded air loop 600 functions as both the indoor air quality loop and the outdoor air flow loop. Advantageously, cascaded air loop 600 is configured to use both the desired outdoor air flow rate (e.g., OAF setpoint) and the IAQ (e.g., IAQ setpoint) without having to switch between the indoor air quality loop and the outdoor air flow loop as other control systems do. Additionally, cascaded air loop 600 provides a linear relationship between IAQ setpoint error and OAF setpoint, according to some embodiments. Cascaded air loop 600 may increase or decrease the OAF setpoint according to the linear relationship.

Example Performance Graph

Figure 7:
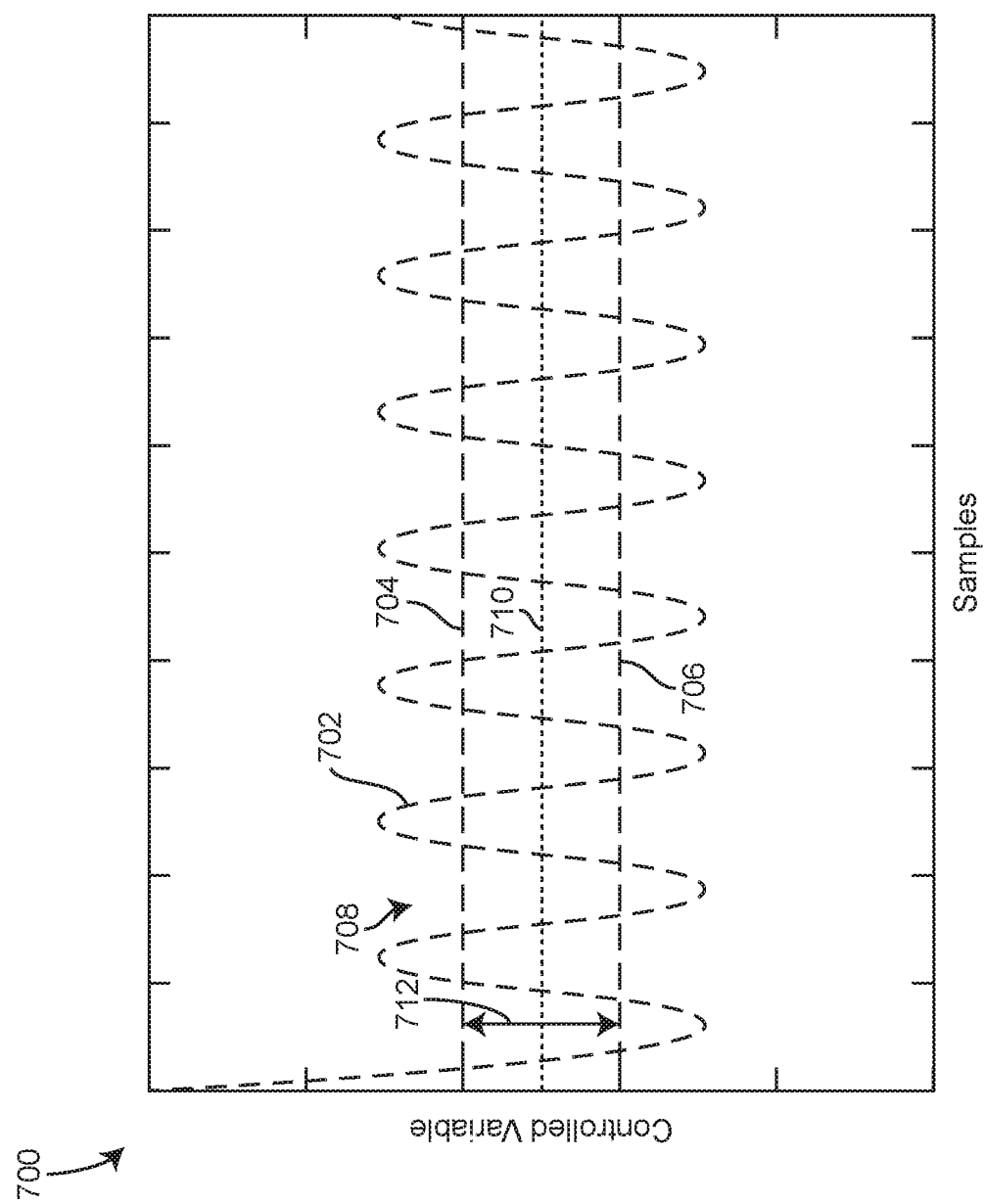
FIG. 7 is an illustrative graph of a deadband and a control variable, according to some embodiments.

Referring now to FIG. 7, an example graph 700 is shown, demonstrating a deadband used by cascaded air quality loop 600, according to some embodiments. The vertical axis (e.g., y-axis) of graph 700 represents a control variable (e.g., a variable to be controlled to maintain a setpoint value), according to some embodiments. Series 702 represents the relationship between the control variable and number of samples taken (e.g., time). The control variable may be any of an outdoor air flow rate, an indoor air quality, an indoor temperature, etc. In some embodiments, the horizontal axis represents a number of samples taken (or time). Graph 700 is shown to include a deadband 708, according to some embodiments. Deadband 708 defines an upper deadband boundary 704 and a lower deadband boundary 706, according to some embodiments. In some embodiments, deadband 708 is centered about a setpoint 710 of the control variable. If deadband 708 is centered about setpoint 710 of the control variable, an amount between upper boundary 704 of deadband 708 and an amount between lower boundary 706 of deadband 708 and setpoint 710 is equal, according to some embodiments. In some embodiments deadband 708 is not centered about setpoint 710. If deadband 708 is not centered about setpoint 710, the amount between upper boundary 704 of deadband 708 and setpoint 710 of the control variable is not equal to the amount between lower boundary 706 of deadband 708 and setpoint 710, according to some embodiments. In some embodiments, deadband 708 is a fixed value 712. In some embodiments, value 712 (and/or upper boundary 704 and/or lower boundary 706) of deadband 708 is adaptively controlled by PVDC 608. In some embodiments, value 712 of deadband 708 is adjusted based on a monitored/determined noise in control variable information. For example, if the OAF information received by PVDC 608 from flow sensor 622 is noisy (e.g., random noise, white noise, etc.), deadband 708 is adjusted (e.g., increased, decreased, etc.). In some embodiments, deadband 708 is adjusted based on a noise to signal ratio. In some embodiments, value 712 of deadband 708 is increased or decreased, while in some embodiments, any of the amount between upper deadband boundary 704 and setpoint 710 and the amount between lower deadband boundary 706 and setpoint 710 is adjusted (e.g., increased or decreased). In some embodiments, value 712 of deadband 708 is constant and an offset of deadband 708 relative to setpoint 710 is adjusted based on an amount of noise in a signal of the control variable (e.g., deadband 708 is offset relative to setpoint 710 such that deadband 708 is not centered about setpoint 710).

In some embodiments, PVDC 608 is configured to adjust an operation of controllable elements 614 in response to the control variable exceeding upper deadband boundary 704 or the control variable being less than lower deadband boundary 706. In some embodiments, PVDC 608 is configured to maintain a current operation (e.g., position/actuation of at least one of dampers 616 and actuator 618) in response to the control variable being within deadband 708 (e.g., less than upper deadband boundary 704 and greater than lower deadband boundary 706).

Cascaded Air Quality Loop Controller

Figure 8:
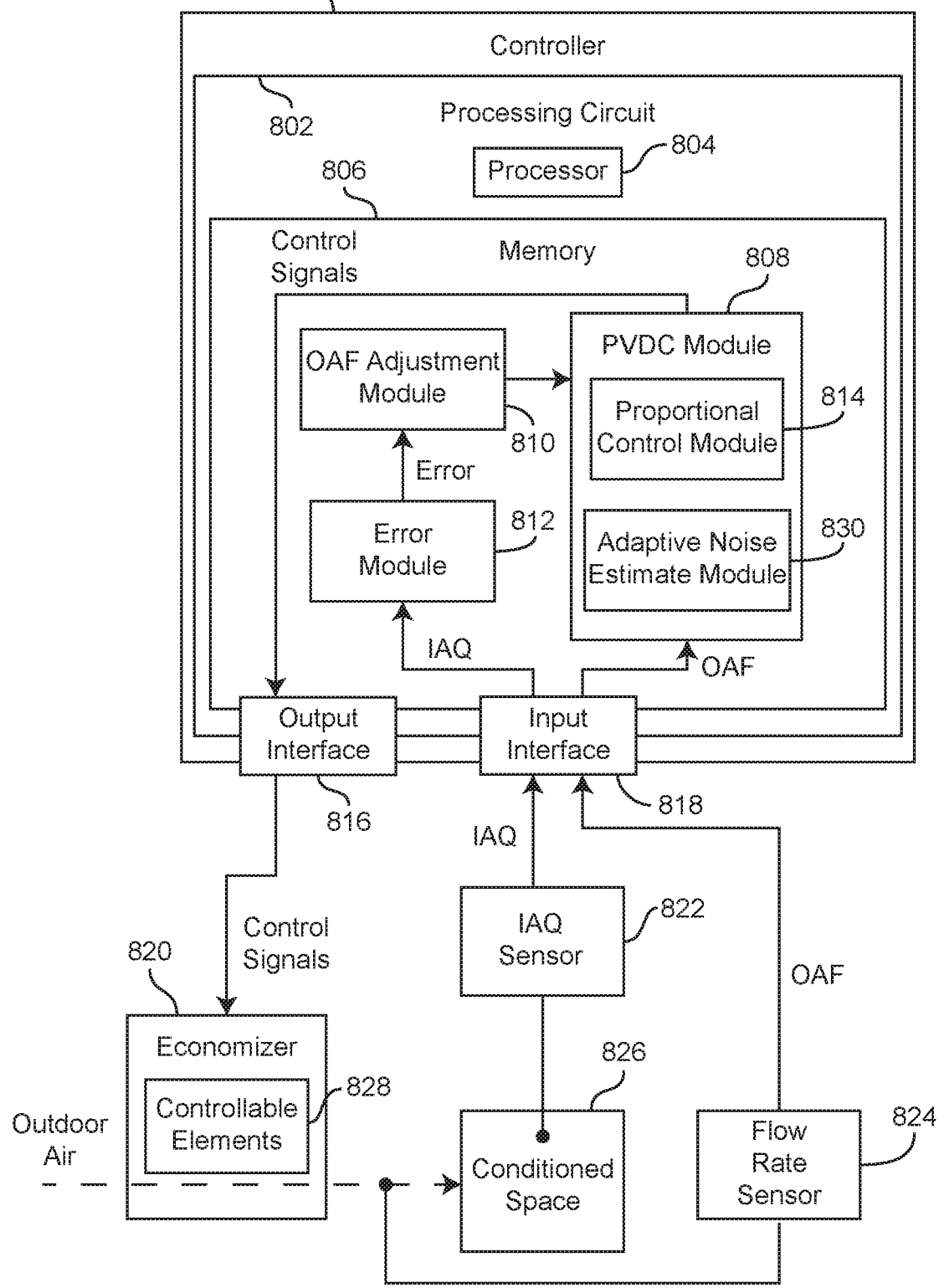
FIG. 8 is a block diagram of a controller which can be used to perform a cascaded control algorithm for an economizer, according to some embodiments.

Referring now to FIG. 8, a controller 800 is shown, according to some embodiments. Controller 800 is configured to generate control signals for controllable elements 828 of economizer 820, according to some embodiments. In some embodiments, controllable elements 828 are controllable elements 614 (e.g., including damper 616 and actuator 618).

Controller 800 is shown to include a communications interface, shown as input interface 818 and output interface 816, according to some embodiments. Input interface 818 and output interface 816 may facilitate communications between controller 800 and external applications (e.g., equipment such as economizer 820) for allowing user control, monitoring, and adjustment to economizer 820 and/or controllable elements 828. Input interface 818 and output interface 816 may also facilitate communications between controller 800. For example, if PVDC module 808 of controller 800 is configured as a separate controller, input interface 818 and output interface 816 may facilitate communication between controller 800 and the separate PVDC controller. Additionally, input interface 818 and output interface 816 may facilitate communication between controller 800 and any of IAQ sensor 822, flow rate sensor 824 and economizer 820.

Input interface 818 and output interface 816 can be or include wired or wireless communications interfaces (e.g., jacks, antennas, transmitters, receivers, transceivers, wire terminals, etc.) for conducting data communications with any of IAQ sensor 822, flow rate sensor 824, and economizer 820, or other external systems or devices. In various embodiments, communications via input interface 818 and output interface 816 can be direct (e.g., local wired or wireless communications) or via a communications network (e.g., a WAN, the Internet, a cellular network, etc.). For example, input interface 818 and output interface 816 can include an Ethernet card and port for sending and receiving data via an Ethernet-based communications link or network. In another example, input interface 818 and output interface 816 can include a Wi-Fi transceiver for communicating via a wireless communications network. In another example, one or both of input interface 818 and output interface 816 can include cellular or mobile phone communications transceivers.

Still referring to FIG. 8, controller 800 is shown to include a processing circuit 802 including a processor 804 and memory 806. Processing circuit 802 can be communicably connected to input interface 818 and/or output interface 816 such that processing circuit 802 and the various components thereof can send and receive data via input interface 818 and output interface 816. Processor 804 can be implemented as a general purpose processor, an application specific integrated circuit (ASIC), one or more field programmable gate arrays (FPGAs), a group of processing components, or other suitable electronic processing components.

Memory 806 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 806 can be or include volatile memory or non-volatile memory. Memory 806 can include database components, object code components, script components, or any other type of information structure for supporting the various activities and information structures described in the present application. According to some embodiments, memory 806 is communicably connected to processor 804 via processing circuit 802 and includes computer code for executing (e.g., by processing circuit 802 and/or processor 804) one or more processes described herein.

Referring still to FIG. 8, controller 800 is shown communicably connected to economizer 820, controllable elements 828, IAQ sensor 822, and flow rate sensor 824, according to some embodiments. In some embodiments, input interface 818 and output interface 816 facilitate communication between controller 800 (e.g., processing circuit 802 of controller 800) and any of economizer 820, IAQ sensor 822, and flow rate sensor 824. Economizer 820 may be any of a condensing and a non-condensing economizer. Economizer 820 includes any of one or more outdoor air temperature sensors, one or more heating coils, one or more cooling coils, one or more outside air dampers, one or more fans, ducts, pipes, joints, plumbing, etc., configured facilitate delivery of outside air to conditioned space 826 to provide cooling for conditioned space 826. Any of the components of economizer 820 which may be controlled to adjust the flow rate of outside air are referred to as controllable elements 828 (e.g., actuator 618 and damper 616), according to some embodiments. In some embodiments, economizer 820 includes a particulate filter configured to filter airborne particles from the outdoor air, such that air provided to conditioned space 826 does not decrease the IAQ of conditioned space 826.

Referring still to FIG. 8, economizer 820 is shown supplying conditioned space 826 with outdoor air, according to some embodiments. IAQ sensor 822 is configured to measure/monitor an IAQ of conditioned space 826, according to some embodiments. In some embodiments, IAQ sensor 822 is IAQ sensor 606. IAQ sensor 822 may be positioned outside of conditioned space 826, or may be positioned within conditioned space 826. If IAQ sensor 822 is positioned outside of conditioned space 826, IAQ sensor 822 includes a probe configured to be located within conditioned space 826, according to some embodiments. IAQ sensor 822 is shown monitoring/measuring an IAQ of conditioned space 826 and providing the IAQ measurement to error module 812 through input interface 818, according to some embodiments. In some embodiments, IAQ sensor 822 provides controller 800 with real time information indicating a present IAQ of conditioned space 826. In some embodiments, IAQ sensor 822 provides controller 800 (e.g., error module 812) with the IAQ of conditioned space 826 periodically at an end of a timestep having a predetermined value. For example, IAQ sensor 822 may provide controller 800 with the IAQ of conditioned space 826 every 1 second, every 0.5 seconds, every 5 seconds, etc.

Referring still to FIG. 8, flow rate sensor 824 is shown monitoring/measuring an OAF of outside air supplied to conditioned space 826 by economizer 820, according to some embodiments. In some embodiments, flow rate sensor 824 is configured to monitor/measure flow rate of any of a liquid (e.g., water) or a gas (e.g., oxygen, air, hydrogen, etc.). Flow rate sensor 824 may be positioned along a flow path of outdoor air provided to conditioned space 826 by economizer 820. In some embodiments, flow rate sensor 824 is configured to monitor any of a mass flow rate of the outdoor air provided to conditioned space 826, a volumetric flow rate of the outdoor air provided to conditioned space 826, and a velocity of the outdoor air provided to conditioned space 826. In some embodiments, flow rate sensor 824 is a component of economizer 820. In some embodiments, flow rate sensor 824 is an additional sensor positioned downstream of economizer 820 and is configured to measure OAF downstream of economizer 820.

Flow rate sensor 824 is shown providing the measured/monitored OAF (e.g., a signal, a data object, time series data, real time data, etc.) to PVDC module 808 of controller 800, according to some embodiments. In some embodiments, flow rate sensor 824 is wiredly connected to input interface 818. In some embodiments, flow rate sensor 824 is wirelessly connected to input interface 818. In some embodiments, flow rate sensor 824 periodically provides PVDC module 808 with the measured/monitored OAF at an end of a time step having a predetermined time period.

Referring still to FIG. 8, controller 800 is shown to include PVDC module 808, OAF adjustment module 810, and error module 812, according to some embodiments. Error module 812 is shown receiving measured/monitored IAQ from IAQ sensor 822, according to some embodiments. In some embodiments error module 812 is provided with an IAQ setpoint from a user interface (not shown) configured to be communicably connected with at least one of input interface 818 and output interface 816. In some embodiments, IAQ setpoint is a predetermined value, determined by one or more air quality standards (e.g. as set by the Occupational Safety and Health Administration). Error module 812 is configured to determine IAQ setpoint error between the IAQ setpoint and the measure/monitored IAQ of conditioned space 826. In some embodiments, the IAQ setpoint error is an absolute error between the IAQ setpoint and the measured/monitored IAQ of conditioned space 826. In some embodiments, IAQ setpoint error is a difference between the IAQ setpoint and the measured/monitored IAQ of conditioned space 826. In some embodiments, IAQ setpoint error is an average error over a time period. For example, error module 812 may periodically receive the measured/monitored IAQ of conditioned space 826 from IAQ sensor 822 at an end of a time interval having a predetermined duration. In some embodiments, error module 812 is configured to average a predetermined number of samples of the measured/monitored IAQ of conditioned space 826 (e.g., a number of samples corresponding to a predetermined time duration) and determine a difference between the average measured/monitored IAQ of conditioned space 826 and the IAQ setpoint. In some embodiments, error module 812 is configured to determine an uncertainty (e.g., a standard deviation) associated with the average IAQ setpoint error. In some embodiments, error module 812 is summing junction 602.

Error module 812 is configured to provide OAF adjustment module 810 with the IAQ setpoint error, according to some embodiments. In some embodiments, OAF adjustment module 810 uses the IAQ setpoint error to determine an OAF setpoint (e.g., the adjusted OAF setpoint) and provide the OAF setpoint to PVDC module 808. In some embodiments, OAF adjustment module 810 is OAF setpoint adjuster 604. OAF adjustment module 810 may be configured to use the adjusted OAF setpoint equation shown above and described in greater detail with reference to FIG. 6. In some embodiments, OAF adjustment module 810 is configured to determine the adjusted OAF setpoint based on the IAQ setpoint error received by error module 812 using any of the functions/operations described in greater detail below with reference to FIG. 9. OAF adjustment module 810 may periodically determine the adjusted OAF setpoint, according to some embodiments. For example, OAF adjustment module 810 may periodically determine the adjusted OAF setpoint at an end of a time step having a predetermined duration, according to some embodiments. In some embodiments, OAF adjustment module 810 determines the adjusted OAF setpoint whenever it receives IAQ setpoint error from error module 812. In some embodiments, OAF adjustment module 810 only determines the adjusted OAF setpoint if the error received from error module 812 exceeds a predetermined amount.

Referring still to FIG. 8, controller 800 is shown to include PVDC module 808, according to some embodiments. In some embodiments, PVDC module 808 is PVDC 608. PVDC module 808 is configured to perform proportional variable deadband control to generate control signals for controllable elements 828 of economizer 820 to adjust economizer 820 such that the adjusted OAF setpoint is met, according to some embodiments. In some embodiments, PVDC module 808 receives feedback of the actual OAF from flow rate sensor 824. PVDC module 808 uses the adjusted OAF setpoint and the feedback from flow rate sensor 824 to adaptively adjust a deadband and generate control signals for economizer 820. In some embodiments, PVDC module 808 functions as described in greater detail below with reference to FIG. 10.

Referring still to FIG. 8, PVDC module 808 is shown to include proportional control module 814 and adaptive noise estimate module 830, according to some embodiments. In some embodiments, adaptive noise estimation module 830 is configured to determine a signal to noise ratio of a signal indicating the actual OAF received from flow rate sensor 824. In some embodiments, adaptive noise estimation module 830 is configured to provide proportional control module 814 with the signal to noise ratio so that proportional control module 814 can adjust the deadband based on the signal to noise ratio. In this way, if a signal associated with the actual OAF received from flow rate sensor 824 includes a large amount of noise (e.g., has a high noise to signal ratio or a low signal to noise ratio), PVDC module 808 increases the deadband such that controllable elements 828 do not superfluously actuate between various operational configurations, according to some embodiments. Advantageously, this prevents controllable elements 828 from undergoing excessive wear and dithering. In some embodiments, proportional control module 814 is configured to perform any feedback control algorithm (e.g., PID control, PI control, stochastic control, etc.).

Adjusted OAF Setpoint Determination

Figure 9:
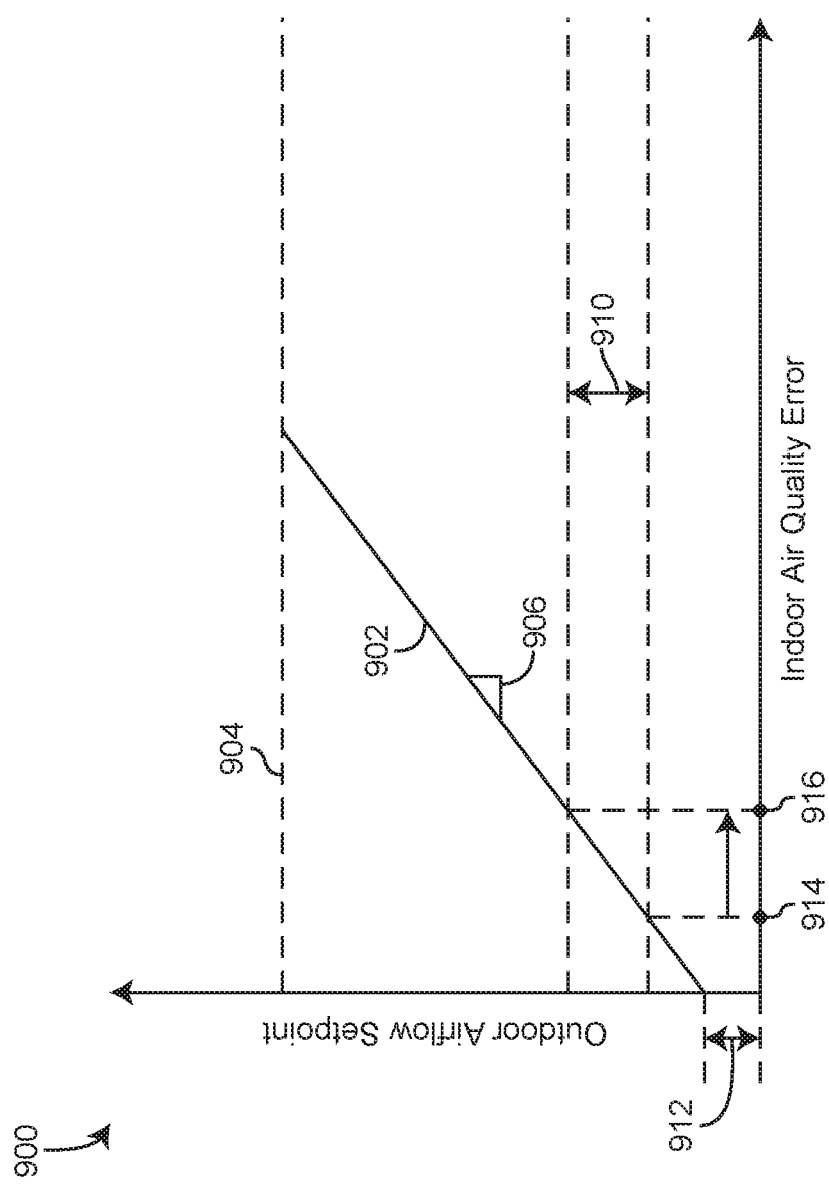
FIG. 9 is a graph of a relationship between an outdoor airflow setpoint and an indoor air quality setpoint error, according to some embodiments.

Referring now to FIG. 9, a graph 900 illustrating the function/operation of OAF setpoint adjuster 604 is shown in greater detail, according to some embodiments. The horizontal axis (e.g., the x-axis) of graph 900 represents IAQ setpoint error (e.g., $e_{IAQ}$), according to some embodiments. In some embodiments, IAQ setpoint error is determined by summing junction 602 and provided to OAF setpoint adjuster 604. In some embodiments, summing junction 602 determines a difference (e.g., an absolute error) between the IAQ setpoint (as determined by a user or by various air quality standards, etc.), and IAQ as measured/monitored and supplied to summing junction 602 by IAQ sensor 606. In some embodiments the difference determined by summing junction 602 is IAQ setpoint error. In some embodiments, OAF setpoint adjuster 604 is configured to receive the IAQ setpoint and the IAQ and determine IAQ setpoint error.

Referring still to FIG. 9, IAQ setpoint error (e.g., the difference as determined and supplied by summing junction 602 and/or OAF setpoint adjuster 604) is shown as an independent variable, according to some embodiments. In some embodiments, the vertical (e.g., y-axis) of graph 900 represents adjusted OAF setpoint. In some embodiments, the OAF setpoint is a dependent variable, depending on the value of IAQ setpoint error. In some embodiments, IAQ setpoint error is used to determine the adjusted OAF setpoint. In some embodiments, the vertical (e.g., y-axis) of graph 900 represents adjusted OAF setpoint.

Referring still to FIG. 9, graph 900 is shown to include series 902, according to some embodiments. In some embodiments, series 902 represents a relationship between IAQ setpoint error and OAF setpoint. In some embodiments, series 902 illustrates a linear relationship between IAQ setpoint error and OAF setpoint. In some embodiments, series 902 is a non-linear relationship (e.g., higher order polynomial, logarithmic, exponential, etc.). In some embodiments, series 902 is a piece-wise function. In some embodiments, series 902 is the adjusted OAF setpoint equation as described in greater detail above with reference to FIG. 6. In some embodiments, the linear relationship between IAQ setpoint error and OAF setpoint is determined based on empirical data. In some embodiments, the linear relationship (e.g., $\beta$) is based on any of a type of economizer, specifications of the economizer, conditioned space parameters (e.g., size, infiltration rate, volume, window area, etc.).

Referring still to FIG. 9, series 902 is shown having an initial value 912 and a slope 906, according to some embodiments. In some embodiments, initial value 912 is an initial OAF setpoint ($OAF_i$). In some embodiments, initial value 912 is $OAF_i$ of the adjusted OAF setpoint equation. In some embodiments, slope 906 is $\beta$. Series 902 is shown limited at an upper OAF setpoint represented by upper boundary 904, according to some embodiments. In some embodiments upper boundary 904 is a maximum achievable OAF value (e.g., a maximum possible OAF based on equipment restraints, a maximum allowable OAF based on performance parameters, etc.). In some embodiments, upper boundary 904 is $OAF_{setpoint,max}$. In some embodiments, upper boundary 904 is $OAF_{setpoint,UL}$. Series 902 is a piece-wise function, mathematically represented as:

$$OAF_{setpoint,adjusted} = \begin{cases} OAF_i + e_{IAQ}\beta, & e_{IAQ} < \frac{(OAF_{setpoint,UL} - OAF_i)}{\beta} \\ OAF_{setpoint,UL}, & e_{IAQ} \geq \frac{(OAF_{setpoint,UL} - OAF_i)}{\beta} \end{cases}$$

according to some embodiments. In the piece-wise function described above, the adjusted OAF setpoint is determined using $OAF_i+e_{IAQ}\beta$ if the condition $$e_{IAQ} > \frac{(OAF_{setpoint,UL} - OAF_i)}{\beta}$$

is met, according to some embodiments. In some embodiments, rearranging the condition $$e_{IAQ} < \frac{(OAF_{setpoint,UL} - OAF_i)}{\beta}$$

results in $e_{IAQ}\beta+OAF_i<OAF_{setpoint,UL}$. In this way, if the adjusted OAF setpoint is less than upper boundary 904 (e.g., $OAF_{setpoint,UL}$, $OAF_{setpoint,max}$), the adjusted OAF setpoint is determined using $OAF_{setpoint,adjusted}=OAF_i+e_{IAQ}\beta$. If, however, the condition is not met, the adjusted OAF setpoint is set equal to $OAF_{setpoint,UL}$ (upper boundary 904), according to some embodiments.

Referring still to FIG. 9, series 902 may be used to determine adjusted OAF setpoint (e.g., $OAF_{setpoint,adjusted}$) or a change in OAF setpoint (e.g., $\Delta OAF_{setpoint}$). In some embodiments the change in OAF setpoint ($\Delta OAF_{setpoint}$) is the $e_{IAQ}\beta$ term of the adjusted OAF equation. For example, if IAQ setpoint error $e_{IAQ}$ changes from a value 914 to a value 916, IAQ setpoint error $e_{IAQ}$ value 916 (or a difference between IAQ setpoint error $e_{IAQ}$ 916 and IAQ setpoint error $e_{IAQ}$ value 914, $\Delta e_{IAQ}$) may be used to determine $\Delta OAF_{setpoint}$ (i.e., value 910) and add or subtract $\Delta OAF_{setpoint}$ to the initial OAF setpoint. In some embodiments, series 902 is only used to adjust OAF setpoint if IAQ setpoint error $e_{IAQ}$ exceeds a threshold value. For example, in some embodiments, the threshold value is IAQ setpoint error value 914. In some embodiments, OAF setpoint adjuster 604 does not increase OAF setpoint until IAQ setpoint error exceeds IAQ setpoint error value 914. In some embodiments, the initial OAF setpoint is increased or decreased based on a sign of $e_{IAQ}$. The change in OAF setpoint is defined by a piece-wise function mathematically represented as:

$$\Delta OAF_{setpoint} = \begin{cases} e_{IAQ}\beta, & e_{IAQ} < \frac{(OAF_{setpoint,UL} - OAF_i)}{\beta} \\ 0, & e_{IAQ} \geq \frac{(OAF_{setpoint,UL} - OAF_i)}{\beta} \end{cases}$$

according to some embodiments. In the piece-wise function described above, the change in OAF setpoint is determined using $e_{IAQ}\beta$ such that a condition $$e_{IAQ} < \frac{(OAF_{setpoint,UL} - OAF_i)}{\beta}$$

is met, according to some embodiments. In some embodiments, rearranging the condition $$e_{IAQ} < \frac{(OAF_{setpoint,UL} - OAF_i)}{\beta}$$

results in $e_{IAQ}\beta + OAF_i < OAF_{setpoint,UL}$. In this way, if the adjusted OAF setpoint is less than upper boundary 904 (e.g., $OAF_{setpoint,UL}$, $OAF_{setpoint,max}$), the change in OAF setpoint is determined using $\Delta OAF_{setpoint}$. If, however, the condition is not met, the change in OAF setpoint is zero (upper boundary 904), according to some embodiments.

In some embodiments, β is determined using an empirical relationship between OAF setpoint and IAQ setpoint error. In some embodiments, β is determined based on a linear regression of empirical data between OAF and IAQ setpoint error. In some embodiments, β has units of $$\frac{\dot{v}}{\Delta ppm}$$

where $\dot{v}$ is volumetric now rate (e.g., the units of OAF) and Δppm is a change in parts per million (e.g., the units of indoor air quality). In some embodiments, β has units such that the term $e_{IAQ}\beta$ has the same units as $OAF_i$. In some embodiments, the relationship between OAF setpoint and IAQ setpoint error is non-linear. For example, the relationship between OAF setpoint and IAQ setpoint error may be a higher order polynomial and have a general equation:

$$OAF_{adjusted} = \alpha_1 e_{IAQ}^2 + \alpha_2 e_{IAQ} + OAF_i$$

according to some embodiments. In some embodiments, the higher order polynomial relationship is determined based on a regression of empirical data. In some embodiments, the higher order polynomial relationship shown above includes a first constant $\alpha_1$ and a second constant $\alpha_2$. In some embodiments, the higher order polynomial relationship is also a piecewise function as described above in greater detail. Likewise, the relationship between OAF setpoint and IAQ setpoint error may be any other non-linear relationship.

In some embodiments, any of β, $\alpha_1$, $\alpha_2$, or any other coefficients are specific to at least one of an application of the economizer, the economizer, parameters of a conditioned space, a building, a set of IAQ codes, etc. For example, in some embodiments, a larger amount of OAF must be brought into a larger conditioned space. Accordingly, for an application where a larger amount of OAF must be brought into the conditioned space, β may be larger than a β corresponding to a smaller conditioned space. Likewise, the value of β may vary based on a type of economizer used, according to some embodiments. In some embodiments, β is determined based on an outdoor air quality. For example, if outdoor air quality is high, less OAF may need to be introduced to the conditioned space (e.g., conditioned space 620, conditioned space 826, etc.). In some embodiments, β is determined based on an empirical relationship between OAF setpoint and IAQ setpoint error and is adjusted (e.g., increased or decreased) based on any of properties of the economizer, IAQ codes, volume of the conditioned space, infiltration of the conditioned space, etc. For example, β is determined using the equation:

$$\beta = \beta_{empirical} \pm \theta$$

according to some embodiments. In some embodiments, $\beta_{empirical}$ is determined based on an empirical relationship between OAF setpoint and IAQ error setpoint (or between OAF and a change in IAQ). In some embodiments, θ is an adjustment parameter and is a function of any of outdoor air quality, IAQ codes, the economizer, parameters (e.g., volume, infiltration rate, etc.) of the conditioned space, etc. In some embodiments, β is adaptively adjusted based on sensor information from an outdoor air quality sensor.

OAF setpoint adjuster 604 may use series 902 (e.g., a linear relationship) or a non-linear relationship to determine the adjusted OAF setpoint based on the IAQ setpoint error. This works on the principle that if the IAQ setpoint is not met (e.g., a sufficiently large IAQ setpoint error is determined), the IAQ setpoint can be met by introducing fresh outdoor air (e.g., by increasing OAF setpoint) into conditioned space 620. In some embodiments, increasing OAF setpoint increases an output of return air from conditioned space 620. In this way, increasing OAF setpoint changes the ventilation provided to conditioned space 620. In some embodiments, a sign of IAQ setpoint error determines if the adjusted OAF setpoint should be increased or decreased. The initial OAF setpoint may be decreased if the actual IAQ exceeds the IAQ setpoint. In some embodiments, graph 900 and/or adjusted OAF equation is only used to increase the IAQ setpoint when the actual IAQ is less than the IAQ setpoint. In some embodiments, the adjusted OAF setpoint is determined based on the initial OAF setpoint and the IAQ setpoint error but the initial OAF setpoint is not changed. In some embodiments, the initial OAF setpoint is determined by an economizer controller or another controller.

Proportional Variable Deadband Controller (PVDC)

Figure 10:
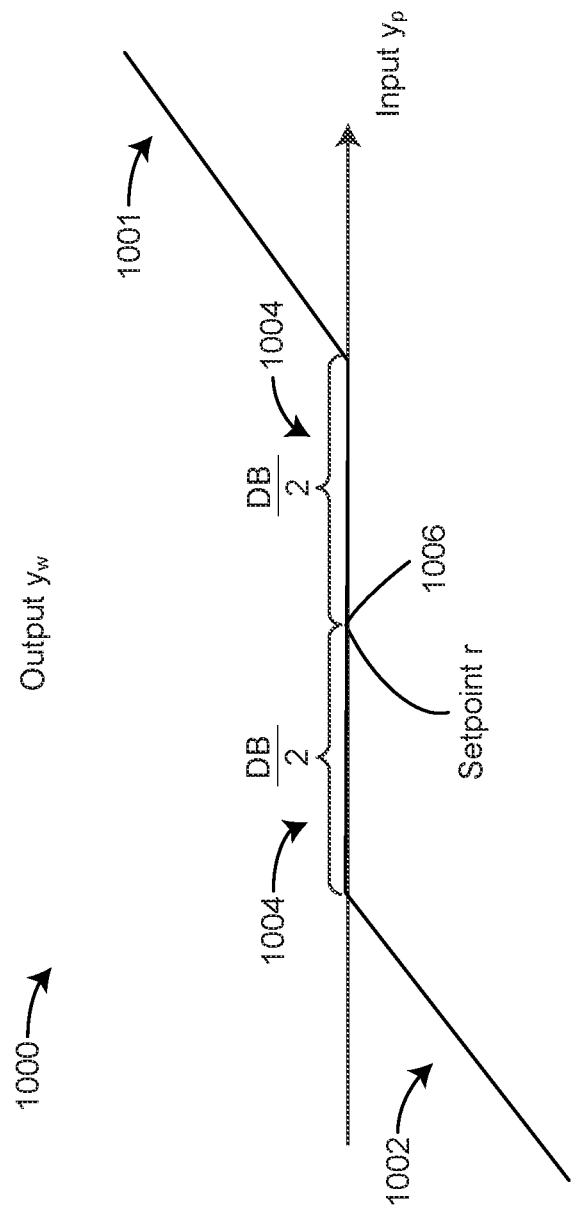
FIG. 10 is a graph illustrating the function of a proportional variable deadband controller (PVDC) which may be implemented in the present disclosure, according to some embodiments.

As described above, a proportional variable deadband controller (PVDC) may be used to control the economizer or controllable elements 614, controllable elements 828, etc., according to the present disclosure. FIG. 10 is a graph illustrating the function of a PVDC. In some embodiments, PVDC 608 (as shown in FIG. 6) is or includes a PVDC. In some embodiments, controller 800 (as shown in FIG. 8) is or includes a PVDC (e.g., PVDC module 808).

In some embodiments, the PVDC includes a deadband filter. The deadband filter may be configured to filter one or more of the measurements ($y_p$) (e.g., actual OAF, measured OAF, etc.) to generate one or more filtered measurements ($y_w$). In some embodiments, the deadband filter determines whether each measurement ($y_p$) is within a deadband range centered around a setpoint (r) for the measured variable ($y_p$). The setpoint (r) may be provided as an input the PVDC (e.g., $OAF_{adjusted}$).

If the measurement ($y_p$) is within the deadband range $$\left(\text{i.e., } r - \frac{DB}{2} \le y_p \le r + \frac{DB}{2}\right),$$

the deadband filter may set the filtered measurement ($y_w$) equal to the setpoint (r). However, if the measurement ($y_p$) is outside the deadband range $$\left(\text{i.e., } y_p < r - \frac{DB}{2} \text{ or } y_p > r + \frac{DB}{2}\right),$$

the deadband filter may add or subtract the deadband threshold $$\frac{DB}{2}$$

from the measurement ($y_p$) to bring the filtered measurement ($y_w$) closer to the setpoint (r). The following equation illustrates the calculation which may be performed by the deadband filter to generate each filtered measurement ($y_w$) as a function of the corresponding raw measurement ($y_p$):

$$y_w = \begin{cases} r & \text{if } |r - y_p| \leq \frac{DB}{2} \\ r - \text{sign}(r - y_p)\left(|r - y_p| - \frac{DB}{2}\right) & \text{if } |r - y_p| > \frac{DB}{2} \end{cases}$$

The horizontal axis of graph 1000 represents the measurement ($y_p$) provided as an input to the deadband filter, whereas the vertical axis of graph 1000 represents the filtered measurement ($y_w$) provided as an output of the deadband filter. The center point 1006 of graph 1000 is equal to the setpoint (r) for measured variable ($y_p$). For example, if measured variable ($y_p$) is a room temperature and the setpoint (r) for the room temperature is 70° F., the center point 1006 of graph 1000 may have a value of 70° F.

Graph 1000 is shown to have two sections: a slope section 1002 and a deadband section 1004. Deadband section 1004 has a range of $$\pm \frac{DB}{2}$$

on either side of the setpoint (r). If the input ($y_p$) to the deadband filter falls within deadband section 2104

$$\left(\text{i.e., } r - \frac{DB}{2} \leq y_p \leq r + \frac{DB}{2}\right),$$

the output ($y_w$) of the deadband filter is equal to the setpoint (r). However, if the input ($y_p$) to the deadband filter falls within slope section 1002, $$\left(\text{i.e., } y_p < r - \frac{DB}{2} \text{ or } y_p > r + \frac{DB}{2}\right),$$

the output ($y_w$) of the deadband filter is a linear function of the input ($y_p$) and is shifted closer to the setpoint (r) by an amount equal to the deadband threshold $$\left(\frac{DB}{2}\right).$$

For example, it me input ($y_p$) falls within slope section 1002 and is less than the setpoint (r), then the output ($y_w$) is equal to $$y_p + \frac{DB}{2}.$$

However, if the input ($y_p$) falls within slope section 1002 and is greater than the setpoint (r), then the output ($y_w$) is equal to $$y_p - \frac{DB}{2}.$$

Advantageously, the deadband filter operates to reduce the integrated error of the measured variable ($y_p$) relative to the setpoint (r) by establishing a deadband section 1004 around the setpoint (r)

$$\left(\text{i.e., } r \pm \frac{DB}{2}\right).$$

If the measurement ($y_p$) falls within deadband section 1004, the filtered measurement ($y_w$) will be equal to the setpoint (r) and the error $e = r - y_w$ will be equal to zero. This ensures that the controller may not accumulate a large integrated error $$\left(\text{e.g., } \sum_{i=1}^{n} e_i\right)$$

over time for persistent values of $y_p$ within deadband section 1004.

Examples of PVDCs which may be used as a controller (e.g. PVDC 608, controller 800, PVDC module 808) according to the present disclosure are described in detail in U.S. patent application Ser. No. 15/619,203 filed on Jun. 9, 2017. The entire disclosure of this patent application is incorporated by reference herein. Additional examples of PVDCs which may be used as a controller (e.g. PVDC 608, controller 800, PVDC module 808) according to the present disclosure are described in detail in U.S. patent application Ser. No. 15/908,041 filed on Feb. 28, 2018. The entire disclosure of this patent application is incorporated by reference herein.

Cascaded Method

Figure 11:
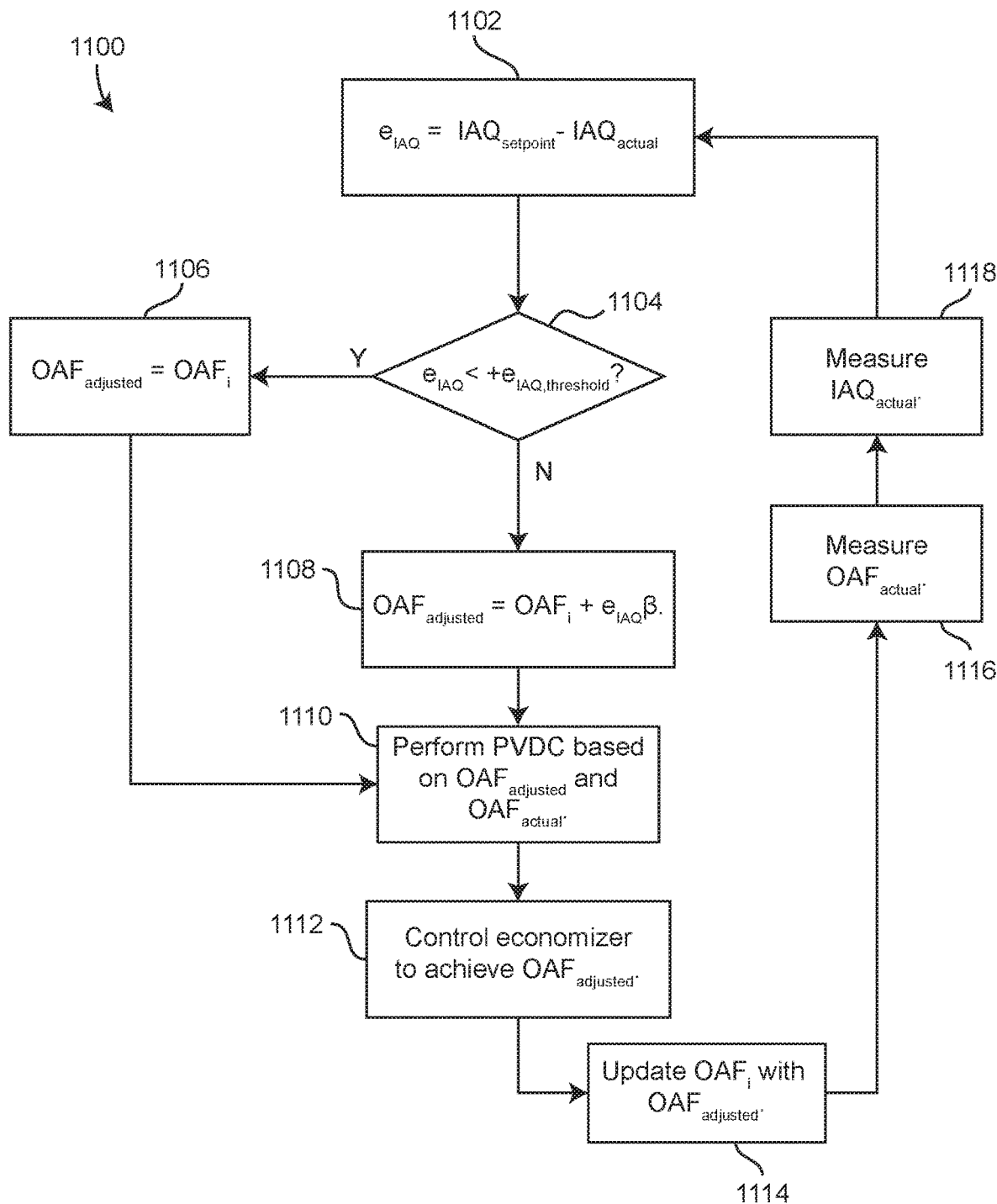
FIG. 11 is a flow chart of a process of a cascaded control algorithm for an economizer, according to some embodiments.

Referring now to FIG. 11, a process 1100 showing a cascaded process of controlling an economizer is shown, according to some embodiments. Process 1100 is shown to include steps 1102-1118, according to some embodiments. In some embodiments, any or all of the steps 1102-1118 are performed in a different order than as shown in FIG. 11. In some embodiments, any of steps 1102-1118 are performed simultaneously.

Process 1100 is shown to include determining an IAQ setpoint error based on an IAQ and an IAQ setpoint (step 1102), according to some embodiments. In some embodiments, the IAQ setpoint error is a difference between the actual IAQ and the IAQ setpoint. In some embodiments the IAQ setpoint error is determined using IAQ setpoint error equation: $e_{IAQ} = IAQ_{setpoint} - IAQ_{actual}$. The IAQ setpoint may be a predetermined value (e.g., a standard as set by OSHA) or it may be determined based on any of characteristics of the economizer, characteristics/parameters of the conditioned space (e.g., volume, window area, type of room, building type, etc.). In some embodiments, step 1102 is performed by any of summing junction 602, OAF setpoint adjuster 604, and OAF adjustment module 810.

Process 1100 is shown to include determining if the IAQ setpoint error is less than an IAQ setpoint error threshold (step 1104). In some embodiments the IAQ setpoint error threshold is zero. In some embodiments, the IAQ setpoint error threshold is a predetermined positive value. Step 1104 may be performed by any of OAF setpoint adjuster 604 and OAF adjustment module 810, according to some embodiments.

If the IAQ setpoint error is less than the IAQ setpoint error threshold, process 1100 shows maintaining a current OAF setpoint value (step 1106) by setting adjusted OAF setpoint to the initial OAF setpoint, according to some embodiments. In some embodiments, step 1106 is performed by any of OAF setpoint adjuster 604 and OAF adjustment module 810. In some embodiments, step 1106 is optional, and the initial OAF setpoint is not change. In some embodiments, the initial OAF setpoint is determined by an economizer controller.

If the IAQ setpoint error is greater than the IAQ setpoint error threshold, process 1100 shows increasing the OAF setpoint (step 1108), according to some embodiments. In some embodiments, the OAF setpoint is increased proportionally to the IAQ setpoint error threshold. In some embodiments, an increase in the OAF setpoint is determined based on at least one of an increase in the IAQ setpoint error and the IAQ setpoint error. In some embodiments, step 1108 is performed by any of OAF adjustment module 810 and OAF setpoint adjuster 604. In some embodiments, the OAF setpoint is increased based on a linear relationship between the IAQ setpoint error and OAF setpoint. In some embodiments, the linear relationship used to determine the OAF setpoint (e.g., an adjusted OAF setpoint, an amount to increase the OAF setpoint by, etc.) is the relationship described in greater detail above with reference to FIG. 9. In some embodiments, the OAF setpoint is only adjusted (e.g., increased) up to an OAF upper limit setpoint. If the linear relationship between the OAF setpoint and the IAQ setpoint error results in an OAF setpoint which exceeds the OAF upper limit setpoint, the OAF setpoint may be set to the OAF upper limit setpoint.

Process 1100 is shown to include performing PVDC based on the adjusted OAF setpoint as determined in step 1108 and an actual OAF (step 1110), according to some embodiments. In some embodiments, the actual OAF is provided by a flow sensor (e.g., any of flow rate sensor 824 and flow sensor 622). In some embodiments, the adjusted OAF setpoint is the adjusted OAF setpoint as determined in step 1106. The PVDC performed based on the adjusted OAF setpoint and the actual OAF is described in greater detail with reference to FIGS. 6-10, according to some embodiments.

Process 1100 includes controlling an economizer to achieve the adjusted OAF setpoint (step 1112), according to some embodiments. In some embodiments, control signals for at least one of a damper and an actuator of the economizer (e.g., controllable elements 828, controllable elements 614) are determined by the PVDC of step 1110.

Process 1100 includes updating the initial OAF setpoint with the adjusted OAF setpoint (step 1114) for any of OAF setpoint adjuster 604, OAF adjustment module 810, controller 800, etc., according to some embodiments. In some embodiments, step 1114 is performed by any of controller 800, PVDC module 808, and PVDC 608. In some embodiments, step 1114 is performed in response to the adjusted OAF setpoint being achieved. In some embodiments, step 1114 is performed in response to any of PVDC 608 and PVDC module 808 receiving an adjusted OAF setpoint. In some embodiments, updating the initial OAF setpoint with the adjusted OAF setpoint (step 1114) is optional, and the initial OAF setpoint is not change. In some embodiments, the initial OAF setpoint is determined by an economizer controller.

Process 1100 includes measuring the actual OAF and measuring the actual IAQ (steps 1116 and 1118), according to some embodiments. In some embodiments, step 1116 is performed by any of flow sensor 622, and flow rate sensor 824. In some embodiments, step 1118 is performed by any of IAQ sensor 606 and IAQ sensor 822. In some embodiments, the actual OAF is provided to any of PVDC 608, controller 800, and PVDC module 808. In some embodiments the actual IAQ is provided to any of OAF setpoint adjuster 604, OAF adjustment module 810, and controller 800. In some embodiments, step 1118 and step 1116 are performed periodically, simultaneously with any of steps 1102-1114.

Figure 12:
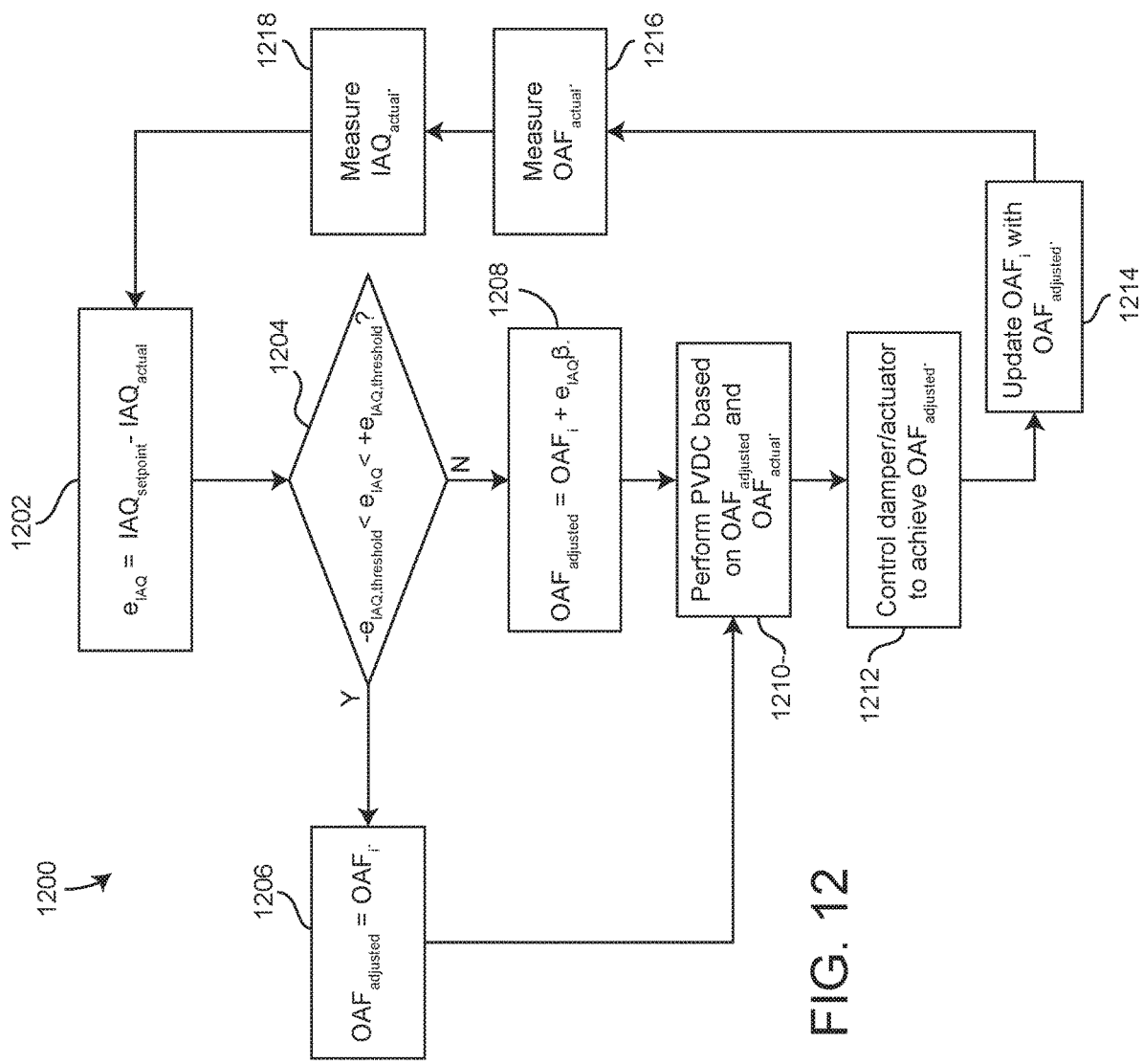
FIG. 12 is a flow chart of a process of a cascaded control algorithm for an economizer, according to some embodiments.

Referring now to FIG. 12, a process 1200 showing an alternative cascaded process of controlling an economizer is shown, according to some embodiments. Process 1200 is shown to include steps 1202-1218, according to some embodiments. In some embodiments, any or all of the steps 1202-1218 are performed in a different order than as shown in FIG. 12. In some embodiments, any of steps 1202-1218 are performed simultaneously.

Process 1200 is shown to include determining an IAQ setpoint error based on an IAQ and an IAQ setpoint (step 1202), according to some embodiments. In some embodiments, step 1202 of process 1200 is step 1102 of process 1100.

Process 1200 includes determining if the IAQ setpoint error is between a positive IAQ setpoint error threshold and a negative IAQ setpoint error threshold. In some embodiments, the positive IAQ setpoint error threshold and the negative IAQ setpoint error threshold are equal in magnitude and have opposite signs. In some embodiments, the positive IAQ setpoint error threshold and the negative IAQ setpoint error threshold are negligible or zero. In some embodiments, the positive IAQ setpoint error has a magnitude greater than or less than a magnitude of the negative IAQ setpoint error.

If the IAQ setpoint error is less than the positive IAQ setpoint error threshold and greater than the negative IAQ setpoint error threshold, the adjusted OAF setpoint is set to the initial OAF setpoint (step 1206), according to some embodiments. In some embodiments, step 1206 is step 1106 of process 1100. In some embodiments, step 1206 is optional, and the initial OAF setpoint is not changed. In some embodiments, the initial OAF setpoint is determined by an economizer controller.

If the IAQ setpoint error is greater than the positive IAQ setpoint error threshold or less than the negative IAQ setpoint error threshold, the adjusted OAF setpoint is calculated using $OAF_{adjusted} = OAF_i + e_{IAQ}\beta$ (step 1208), according to some embodiments. In some embodiments, step 1208 is step 1108 of process 1100, however, since the IAQ setpoint error may be negative (due to step 1204), the $e_{IAQ}\beta$ may be negative as well (e.g., resulting in the adjusted OAF setpoint being less than the initial OAF setpoint). In this way if the actual IAQ exceeds the setpoint IAQ, the initial OAF setpoint can be decreased, according to some embodiments. In some embodiments, updating/changing the initial OAF setpoint is optional. In some embodiments, the initial OAF setpoint is determined by an economizer controller and is not changed/updated.

Process 1200 includes performing PVDC based on the adjusted OAF setpoint and the actual OAF (step 1210), according to some embodiments. Process 1200 also includes controlling the economizer to achieve the adjusted OAF setpoint (step 1212), according to some embodiments. Process 1200 also includes updating the initial OAF setpoint with the adjusted OAF setpoint (step 1214), according to some embodiments. Process 1200 also includes measuring the actual OAF (step 1216) and measuring the actual IAQ (step 1218), according to some embodiments. In some embodiments, steps 1210-1218 are steps 1110-1118 of process 1100, described in greater detail with reference to FIG. 11. In some embodiments, step 1216 is optional, and the initial OAF setpoint is not changed. In some embodiments, the initial OAF setpoint is determined by an economizer controller.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for an economizer that provides outdoor air to a conditioned space, the controller comprising:
   an error calculator configured determine an indoor air quality (IAQ) setpoint error based on an actual IAQ and an IAQ setpoint;
   an outdoor air flow (OAF) setpoint adjuster configured to determine an adjusted OAF setpoint based on the IAQ setpoint error, an initial or previous OAF setpoint, and an OAF setpoint upper limit in response to a comparison between the initial or previous IAQ setpoint error and an IAQ setpoint error threshold; and
   a proportional variable deadband controller (PVDC) configured to adjust an operational deadband of the economizer based on an actual OAF and the adjusted OAF setpoint, the PVDC configured to use the adjusted operational deadband to adjust an operation of at least one of an actuator and a damper of the economizer to achieve the adjusted OAF and drive the actual IAQ to toward the IAQ setpoint.

2. The controller of claim 1, wherein the controller is further configured to receive information from one or more sensors, wherein the one or more sensors are configured to measure at least one of the actual IAQ and the actual OAF of the conditioned space and the received information comprises a signal associated with at least one of the actual IAQ and the actual OAF and the error calculator is configured to determine the IAQ setpoint error by calculating a difference between the IAQ setpoint and the actual IAQ.

3. The controller of claim 1, wherein the OAF setpoint adjuster is configured to determine the adjusted OAF setpoint based on a linear relationship between the IAQ setpoint error and an amount to increase or decrease the initial OAF setpoint to achieve the adjusted OAF setpoint.

4. The controller of claim 3, wherein the OAF setpoint adjuster is configured to determine an adjusted OAF setpoint greater than the initial OAF setpoint in response to the IAQ error being a positive value that is greater than the IAQ setpoint error threshold, wherein the IAQ error being a positive value indicates the actual IAQ is less than the IAQ setpoint.

5. The controller of claim 4, wherein the IAQ setpoint error threshold is zero.

6. The controller of claim 1, wherein the controller is further configured to update the initial OAF setpoint with the adjusted OAF setpoint in response to the actual OAF being driven to the adjusted OAF setpoint.

7. The controller of claim 1, wherein the at least one sensor is at least one of an air quality sensor and a flow rate sensor, wherein the air quality sensor is configured to measure the actual IAQ of the conditioned space and wherein the flow rate sensor is configured to measure the actual OAF of outdoor air provided to the conditioned space.

8. A control system for an economizer, the control system comprising:

an economizer configured to facilitate an outdoor air flow (OAF) of outdoor air into a conditioned space;

a flow rate sensor configured to measure an actual OAF of the outdoor air entering the conditioned space;

an air quality sensor configured to measure an actual indoor air quality (IAQ) of the conditioned space; and a controller configured to:

receive the actual IAQ of the conditioned space and determine an IAQ setpoint error based on the actual IAQ and an IAQ setpoint;

determine an adjusted OAF setpoint based on the IAQ setpoint error, an initial or previous OAF setpoint, and an OAF setpoint upper limit in response to a comparison between the initial or previous IAQ setpoint error and an IAQ setpoint error threshold;

perform proportional variable deadband control to adjust a deadband of the economizer based on the adjusted OAF setpoint and the actual OAF and generate control signals to cause the economizer to drive the OAF toward the adjusted OAF setpoint; and adjust an operation of at least one of an actuator and a damper of the economizer to cause outdoor air to enter the conditioned space at the adjusted OAF setpoint.

9. The control system of claim 8, wherein the controller is configured to determine the adjusted OAF setpoint by determining an increase amount based on the IAQ setpoint error and adding the increase amount to an initial OAF setpoint.

10. The control system of claim 9, wherein the controller is configured to determine the adjusted OAF setpoint based on a linear relationship between OAF and the IAQ setpoint error.

11. The control system of claim 10, wherein the controller is configured to determine that the adjusted OAF setpoint is greater than the initial OAF setpoint in response to the actual IAQ being less than the IAQ setpoint.

12. The control system of claim 10, wherein the linear relationship is a piece wise function.

13. The control system of claim 8, wherein the determined IAQ setpoint error is a difference between the IAQ setpoint and the actual IAQ.

14. The control system of claim 8, wherein the adjusted OAF setpoint ensures that the IAQ setpoint is met or exceeded.

15. The control system of claim 8, wherein the controller is configured to determine a signal to noise ratio of a signal associated with the actual OAF and adjust the deadband of the economizer based on the determined signal to noise ratio.

16. A method for controlling an economizer, the method comprising:

receiving, from a first sensor, an actual indoor air quality (IAQ) of a conditioned space;

determining an IAQ setpoint error based on the actual IAQ and an IAQ setpoint;

determining an adjusted outdoor air flow (OAF) setpoint based on the IAQ setpoint error, an initial or previous OAF setpoint, and an OAF setpoint upper limit in response to the IAQ setpoint error exceeding an IAQ setpoint error threshold;

receiving, from a second sensor, an actual outdoor air flow (OAF) of outdoor air entering the conditioned space;

adjusting a deadband of the economizer based on the adjusted OAF setpoint and the actual OAF using a proportional variable deadband control technique and generating control signals for the economizer to achieve the adjusted OAF setpoint based on the actual OAF and the adjusted deadband;

controlling the economizer to drive the actual OAF toward the adjusted OAF setpoint; and repeating the steps of receiving the actual OAF from the second sensor, adjusting the deadband and generating control signals, and controlling the economizer until the actual OAF meets the OAF setpoint.

17. The method of claim 16, wherein determining the adjusted OAF setpoint further comprises determining a required increase or decrease of the initial OAF setpoint based on a linear relationship between the IAQ setpoint error and a required change of the initial or previous OAF setpoint.

18. The method of claim 17, wherein determining the adjusted OAF setpoint further comprises increasing the initial or previous OAF setpoint in response to the IAQ setpoint being greater than the actual IAQ and decreasing the initial OAF setpoint in response to the IAQ setpoint being less than the actual IAQ.

19. The method of claim 16, further comprising defining the adjusted OAF setpoint as the initial or previous OAF setpoint in response to the IAQ setpoint error being negligible.

20. The method of claim 16, further comprising determining a signal to noise ratio of a signal associated with the actual OAF and adjusting the deadband based on the signal to noise ratio.

* * * * *